(12) United States Patent
Mathieson

(10) Patent No.: US 11,970,859 B2
(45) Date of Patent: Apr. 30, 2024

(54) ONE-PIECE SHINGLE REPAIR PATCH

(71) Applicant: Thomas R. Mathieson, Louisville, CO (US)

(72) Inventor: Thomas R. Mathieson, Louisville, CO (US)

( * ) Notice: Subject to any disclaimer, the term of this patent is extended or adjusted under 35 U.S.C. 154(b) by 129 days.

(21) Appl. No.: 17/236,452

(22) Filed: Apr. 21, 2021

(65) Prior Publication Data

US 2021/0238853 A1 Aug. 5, 2021

Related U.S. Application Data

(63) Continuation-in-part of application No. 16/002,544, filed on Jun. 7, 2018, now abandoned, which is a
(Continued)

(51) Int. Cl.
*E04D 1/28* (2006.01)
*B32B 3/08* (2006.01)
(Continued)

(52) U.S. Cl.
CPC .............. *E04D 1/28* (2013.01); *B32B 3/08* (2013.01); *B32B 5/16* (2013.01); *B32B 7/06* (2013.01);
(Continued)

(58) Field of Classification Search
CPC .. B32B 3/02; B32B 3/08; B32B 3/263; B32B 5/16; B32B 5/26; B32B 7/06; B32B 7/12; B32B 11/02; B32B 11/044; B32B 11/10; B32B 23/10; B32B 25/10; B32B 2262/101; B32B 2307/402; B32B 2307/4026; B32B 2307/714; B32B 2307/7265; B32B 2307/744; B32B 2419/06; E04D 1/20; E04D 1/28; E04D 1/29; E04D 2001/005;
(Continued)

(56) References Cited

U.S. PATENT DOCUMENTS 1,583,163 A 5/1926 Munro
1,649,635 A 11/1927 Willard
(Continued)

FOREIGN PATENT DOCUMENTS

JP 02272152 A 11/1990
JP 2001173623 A 6/2001
(Continued)

*Primary Examiner* — James M Ference
(74) *Attorney, Agent, or Firm* — Husch Blackwell LLP

(57) ABSTRACT

A shingle repair patch is provided that may include a base member and granules. An adhesive strip is positioned proximate an upper edge on the underside of the base member, or elsewhere on the underside of the base member. The adhesive strip preferably permanently bonds a rigid lip to the base member. The rigid lip preferably extends beyond the upper edge of the base member. An adhesive strip may be positioned on at least a portion of the bottom side of the rigid lip. Release tape is temporarily affixed to the adhesive strip. The adhesive strip is composed of an adhesive that adheres securely without an extended or heat-induced cure period. Standard adhesive may be applied to the remainder of the bottom of the base member, or further adhesive like that found in the adhesive strip may be applied to the remainder of the bottom of the base member.

13 Claims, 10 Drawing Sheets

Related U.S. Application Data continuation-in-part of application No. 15/486,665, filed on Apr. 13, 2017, now Pat. No. 10,190,316, which is a continuation-in-part of application No. 14/965,559, filed on Dec. 10, 2015, now Pat. No. 9,631,383.

(51) Int. Cl.
  *B32B 5/16* (2006.01)
  *B32B 7/06* (2019.01)
  *B32B 7/12* (2006.01)
  *E04D 1/00* (2006.01)

(52) U.S. Cl.
  CPC .............. *B32B 7/12* (2013.01); *E04D 1/29* (2019.08); *B32B 2307/402* (2013.01); *B32B 2307/714* (2013.01); *B32B 2307/7265* (2013.01); *B32B 2307/744* (2013.01); *B32B 2419/06* (2013.01); *E04D 2001/005* (2013.01)

(58) Field of Classification Search
  CPC ......... E04D 2001/3435; E04G 23/0281; F16B 11/006
  See application file for complete search history.

(56) References Cited

U.S. PATENT DOCUMENTS

| | | | |
|---|---|---|---|
| 2,013,332 A * | 9/1935 | Anderson | E04B 1/66 427/345 |
| 2,421,892 A | 6/1947 | Kirschbraun | |
| 2,576,262 A | 11/1951 | Morehead | |
| 2,674,026 A | 4/1954 | St Palley | |
| 3,049,836 A | 8/1962 | Weissman | |
| 3,252,257 A | 5/1966 | Price et al. | |
| 3,434,259 A | 3/1969 | Corbin | |
| 3,468,092 A | 9/1969 | Chalmers | |
| 3,484,267 A | 12/1969 | Sadler | |
| 3,485,134 A | 12/1969 | Ott | |
| 4,010,590 A | 3/1977 | Reinke | |
| 4,195,461 A | 4/1980 | Thiis-Evensen | |
| 4,343,215 A | 8/1982 | Fuchs | |
| 4,637,191 A | 1/1987 | Smith | |
| 4,659,604 A | 4/1987 | Lambuth | |
| 4,686,808 A | 8/1987 | Triplett | |
| 4,781,508 A | 11/1988 | Schroeder et al. | |
| 4,787,188 A | 11/1988 | Murphy | |
| 4,788,807 A | 12/1988 | Whitman | |
| 4,982,543 A | 1/1991 | Boyd | |
| 5,070,670 A | 12/1991 | Alderson | |
| 5,204,148 A | 4/1993 | Alexander et al. | |
| 5,311,716 A | 5/1994 | Houssin | |
| 5,419,666 A | 5/1995 | Best | |
| 5,452,558 A * | 9/1995 | Eastin | E04D 1/36 405/152 |
| 5,640,820 A | 6/1997 | Wood | |
| 5,669,277 A | 9/1997 | Perrone | |
| 5,800,891 A | 9/1998 | Wasitis | |
| 5,916,103 A | 6/1999 | Roberts | |
| 6,050,042 A * | 4/2000 | Durachko | E04D 1/26 52/557 |
| 6,148,578 A | 11/2000 | Nowacek et al. | |
| 6,701,685 B2 | 3/2004 | Rippey | |
| 6,820,635 B1 | 11/2004 | McKeague | |
| 6,874,289 B2 * | 4/2005 | Koch | E04D 1/30 52/522 |
| 6,918,219 B1 * | 7/2005 | Olson | E04G 23/0203 52/514 |
| 7,685,784 B2 | 3/2010 | Wang et al. | |
| 7,712,275 B2 | 5/2010 | Kelly | |
| 8,210,785 B1 | 7/2012 | Gager | |
| 8,297,020 B1 * | 10/2012 | Swanson | E04D 1/26 52/412 |
| 8,549,793 B1 * | 10/2013 | Gens | F24S 25/61 52/302.6 |
| 8,763,337 B2 | 7/2014 | Buckwalter et al. | |
| 9,017,791 B2 | 4/2015 | Grubka et al. | |
| 9,206,835 B2 | 12/2015 | Mathieson | |
| 9,238,915 B2 * | 1/2016 | Roseveare, Jr. | E04D 13/00 |
| 2003/0141377 A1 | 7/2003 | Dupre | |
| 2004/0055240 A1 | 3/2004 | Kiik et al. | |
| 2004/0161569 A1 | 8/2004 | Zanchetta et al. | |
| 2004/0172908 A1 | 9/2004 | Swann | |
| 2005/0075029 A1 | 4/2005 | Ogawa et al. | |
| 2005/0102922 A1 | 5/2005 | Williams | |
| 2005/0181164 A1 | 8/2005 | Piumarta et al. | |
| 2005/0193673 A1 | 9/2005 | Rodrigues et al. | |
| 2005/0204675 A1 | 9/2005 | Snyder et al. | |
| 2006/0059825 A1 | 3/2006 | Wiercinski et al. | |
| 2006/0099370 A1 | 5/2006 | Glass | |
| 2006/0127627 A1 | 6/2006 | Larson et al. | |
| 2006/0179767 A1 | 8/2006 | Miller et al. | |
| 2006/0251888 A1 * | 11/2006 | Lane | B32B 27/32 428/354 |
| 2006/0283134 A1 * | 12/2006 | Shah | E04D 5/00 52/741.4 |
| 2007/0199251 A1 | 8/2007 | Sieling et al. | |
| 2007/0199276 A1 | 8/2007 | Duque | |
| 2007/0261337 A1 | 11/2007 | Whitaker et al. | |
| 2008/0155923 A1 | 7/2008 | Teng et al. | |
| 2008/0209835 A1 | 9/2008 | Margarites | |
| 2009/0145944 A1 | 6/2009 | Shor | |
| 2009/0158685 A1 * | 6/2009 | Swanson | E04D 1/26 52/543 |
| 2010/0192509 A1 | 8/2010 | Sieling et al. | |
| 2011/0041446 A1 | 2/2011 | Stephens et al. | |
| 2011/0289879 A1 | 12/2011 | Binkley et al. | |
| 2012/0017521 A1 | 1/2012 | Botke | |
| 2013/0025224 A1 | 1/2013 | Vermilion et al. | |
| 2013/0059170 A1 | 3/2013 | Kim | |
| 2013/0324030 A1 | 12/2013 | Rotter | |
| 2015/0267411 A1 * | 9/2015 | Roseveare, Jr. | E04D 13/00 52/58 |
| 2015/0330082 A1 * | 11/2015 | Roseveare, Jr. | E04D 13/00 52/58 |
| 2015/0366390 A1 | 12/2015 | LeBlanc et al. | |
| 2016/0002914 A1 | 1/2016 | Snyder et al. | |
| 2016/0024794 A1 | 1/2016 | Jenkins et al. | |
| 2017/0058528 A1 | 3/2017 | Verhoff et al. | |

FOREIGN PATENT DOCUMENTS

| | | |
|---|---|---|
| JP | 2016199607 A | 12/2016 |
| WO | 8102437 A1 | 9/1981 |

* cited by examiner

ONE-PIECE SHINGLE REPAIR PATCH

CROSS-REFERENCE TO RELATED APPLICATION

This application claims priority to U.S. patent application Ser. No. 16/002,544, filed Jun. 7, 2018, which claims priority to and the benefit of U.S. patent application Ser. No. 15/486,665, filed Apr. 13, 2017, which claims priority to and the benefit of U.S. Pat. No. 9,631,383, issued Apr. 25, 2017. The entire disclosures of U.S. patent application Ser. Nos. 16/002,544 and 15/486,665, and U.S. Utility Pat. No. 9,631,383 are hereby incorporated herein by reference.

BACKGROUND OF THE INVENTION

The present invention relates generally to systems and methods for repairing and sealing asphalt shingles and, more particularly, to several embodiments of a shingle patch for repairing damaged asphalt shingle and for overlaying exposed nails on a roof structure.

Shingled roofs are typically laid in an overlapping pattern which necessarily requires the roofer to begin laying the shingles at the lowest point of the roof and moving horizontally until one row of shingles is complete. Asphalt shingles are typically nailed to the roof along the uppermost perimeter edge and the horizontal rows progress upwardly with each asphalt shingle slightly overlapping the one below it, thereby covering the nails securing the underlying shingle. With this progression, the shingles are laid in an overlapping specific pattern and it can be seen that at certain positions on the roof, for example, at edges abutting dormers, chimneys, and at the last row of shingles at the apex of the roof, at a roof/wall intersection, the last course of nails will not be covered by an adjacent shingle and such uncovered nails are therefore exposed to the elements.

Exposed nails can also occur if nails are improperly installed on shingled roofs. When an installer nails shingles to a roof, there is a small zone on the shingles where the nails can be placed so that they will be covered by the next row of overlapping shingles. When nails are installed below this zone, those nails will not be covered by the succeeding row of shingles. They will remain visible and can cause leaking.

If left exposed, all such uncovered nails will corrode to the point that they may lose their grip or hold on the respective shingles that they are securing to the roof structure.

Shingled roofs are also subject to a wide variety of weather-related damage including hail damage, storm damage, wind damage and the like. In the particular case of hail damage, or any other damage to a particular asphalt shingle, the present methods for replacing damaged shingles are labor-intensive, time consuming and not very cost-effective, particularly, if the damaged shingles are located in the center portion of the roof structure. Current replacement methods typically require a roofer to remove the damaged shingles. Such repair also then requires removal or at least lifting and separating surrounding shingles since shingled roofs are laid in an overlapping fashion as explained above. Because replacing individual shingles is time consuming, labor-intensive, and may even cause damage to surrounding shingles, there does exist a need for a better, less labor-intensive, and faster system for repairing damaged asphalt shingles without necessarily removing the damaged shingle.

Some repairs are attempted with shingle patches. Such shingle patches are often applied to the damaged roofing shingles with an adhesive. However, such adhesives usually take a long time to cure. Such curing often occurs over the space of several hours or days (or even weeks to months) due to heat from direct sunlight or other factors. When first installed, however, such adhesives remain wet and do not have much ability to retain the shingle in place when stressed. For example, if a worker accidentally steps on a repair patch, the entire patch may become dislodged, potentially causing the worker to slip and fall. Further, such adhesives may not be water-tight prior to fully curing and may be blown off by wind.

In view of the foregoing, it will be apparent to those skilled in the art that a need exists for a shingle patch for hail damage repair of asphalt shingles as well as patches for covering exposed nail heads. The present invention addresses this need as well as other needs which will become apparent to those skilled in the art after reading the present disclosure.

SUMMARY OF THE INVENTION

The present invention is directed to several embodiments of a shingle patch system which can be used to repair hail damage and any other shingle damage associated with asphalt shingles and which can be used to cover exposed nails.

In one aspect of the present invention, several embodiments of a shingle patch are disclosed wherein the patch can be overlaid on top of a damaged asphalt shingle such as a shingle having weather damage thereby eliminating the need for totally removing the damaged shingle. One embodiment of the present shingle patch includes a patch base member having one end portion of the base member specifically structured for sliding under an existing shingle such as the shingle located immediately above the damaged shingle, whereas the opposite end portion of the present shingle patch base member includes a roof nail built into the patch itself. The top portion of the base member includes colored granules that are embedded into the patch so as to match the color of the existing damaged shingle. In this regard, the present patch can be produced in multiple colors so as to match the known existing asphalt shingle colors in the marketplace, or the patch can be manufactured on site in the field by using a pre-made patch base member as will be hereinafter further explained and thereafter affixing colored granules to the patch base member in the field so as to match the existing colors of the roof to be repaired.

A sealant is associated with the bottom portion of the shingle patch base member and optionally with that portion of the patch base member to be inserted under the existing shingle located above the damaged shingle. This sealant is preferably heat activated and can be factory applied and is typically activated by the sun. A cellophane tape or other material can be placed over the sealant areas so as to prevent the sealant from binding to any other material during shipment and storage. The tape is removed prior to installing the shingle patch over the damaged shingle. In this regard, a technician will lift the bottom edge of the shingle that lies just one row above the damaged shingle, remove the release tape from that portion of the shingle patch that slides under the existing shingle, and then insert that portion of the shingle patch under the raised shingle. The raised shingle is then lowered onto that portion of the shingle patch and that portion of the patch will bind to the existing shingle through the sealant. Once inserted under the existing adjacent shingle, the bottom portion of the shingle patch may also seal directly to the damaged shingle via the sealant located on the bottom portion of the present patch upon removing the tape previously covering the sealant of the bottom surface. Once inserted under the existing adjacent shingle, the opposite end portion of the shingle patch housing the integrated roof nail is then nailed to the damaged shingle thereby allowing the under surface of the shingle patch to seal directly to the damaged shingle via the sealant located on the bottom portion of the present patch. Once complete, the present shingle patch will overlay the damaged shingle and will match the color scheme of the roof. Since the damaged shingle remains in place, the present shingle patch provides a double layer of protection over the damaged shingle since the damaged shingle still provides some protection to the roof structure.

In another embodiment of the present shingle patch, the patch base member again includes one end portion that slides under an existing shingle, colored granules embedded in its top surface to match the color scheme of the roof shingle to be repaired, and a sealant covering both that portion of the base member which again slides under the existing shingle as well as covering the bottom surface of the base member. In contrast to the other embodiment of the present shingle patch, this patch embodiment includes a flap portion at its opposite end portion, the flap portion being lifted so that a standard roof nail can be nailed through the corresponding mating surface of the base member into the underlying damaged shingle. In this particular embodiment, an integrated roof nail is not associated with the patch. Instead, the inner surface of the flap portion and its corresponding mating surface are likewise covered with a sealant and both surfaces are likewise covered with a cellophane tape or other release tape to prevent such mating surfaces from bonding together until required. This embodiment of the present patch is again inserted under an existing shingle located immediately above the damaged shingle and once so inserted, the flap portion at the opposite end portion of the base member is lifted, the release tape is removed and a standard roof nail is then nailed through the mating surface of the base member located under the flap portion and through the damaged shingle located below. Once the standard roof nail is hammered into place, the flap portion is lowered such that the flap will cover the head of the standard roof nail just hammered into place. As such, the flap portion serves as a roof nail seal and completely covers the nail head thereby preventing exposure to the elements. The sealant located on the bottom surface of the shingle patch as well as on the mating flap areas and on the area that slides under the existing shingle are all preferably activated either by the sun or by other heat sources thereby bonding the shingle patch to the existing shingle, the damaged shingle and to various portions of the patch itself. Here again, this embodiment of the present shingle patch overlays the damaged shingle and provides an extra layer of protection to the roof structure.

In a separate embodiment substantially similar to the first embodiment described above, the nail integrated into the roofing patch is omitted. Instead the sealant located on the bottom surface of the base member is sufficient in and of itself to secure the shingle patch to a damaged asphalt shingle and the one end portion that slides under an existing shingle, in an alternative embodiment, includes a tapered surface.

In yet another embodiment of the present shingle patch, the patch is made up of two separate parts and again includes no nails. The shingle patch includes each an upper base member and a lower base member. The lower base member again includes one end portion that slides under an existing shingle just above the damaged shingle in need of repair. A sealant covers at least a part of one or both of its upper surface and its bottom surface, and such sealant may be field applied or factory applied. Both surfaces are likewise covered with a cellophane tape or other release tape to prevent them from bonding together or with other materials until desired. The top portion of the upper base member again includes colored granules that are embedded into its surface so as to match the color of the existing damaged shingle. Thus, like the single patch designs, the two-piece patch can be produced in multiple colors so as to match the known existing asphalt shingle colors in the marketplace, or the patch can be manufactured on site in the field by using a pre-made patch base member as will be hereinafter further explained and thereafter affixing colored granules to the patch upper base member in the field so as to match the existing colors of the roof to be repaired. A sealant covers the lower surface of the upper base member, and a cellophane tape or other release tape is provided on the lower surface to prevent it from bonding with the lower base member until required.

This embodiment of the present patch involves inserting the lower base member under an existing shingle located immediately above the damaged shingle. In this regard, a technician will again lift the bottom edge of the shingle just one row above the damaged shingle and remove the release tape from an end portion of the upper surface of the lower base member. The end portion of the lower base member may then slide under the existing, raised shingle. The raised shingle is then lowered onto that end portion of the shingle patch and that portion of the patch will bind to the existing shingle through the sealant. Once inserted under the existing adjacent shingle, the lower base member may also seal directly to the damaged shingle via the sealant located on the bottom portion of the lower base member (after tape associated therewith is removed). Subsequently, tape may be removed from the lower surface of the upper base member and the remaining upper surface of the lower base member before overlaying the upper base member on the lower base member. Sealant on the upper surface of the lower base member not located under the shingle one row above the damaged shingle may then adhere to sealant on the lower surface of the upper base member. With the upper and lower base members adhered to one another, the two-piece shingle patch will overlay the damaged shingle and will match the color scheme of the roof. This two-piece shingle patch provides a triple layer of protection over the damaged shingle since the damaged shingle still provides some protection to the roof structure.

Other embodiments include eliminating that portion of the present shingle patch that is inserted under the existing shingle located immediately above the damaged shingle and merely abutting one end portion of the present shingle patch with the edge of the existing shingle located immediately above the damaged shingle; utilizing a double sided adhesive tape to form both that portion of a patch that is inserted under an existing shingle and an entire patch itself; and utilizing a double sided adhesive tape to form a shingle patch with and without a notch having a flap portion which can be lifted so that a roofing nail can be nailed into a portion of the patch.

In another embodiment, a shingle repair patch may include a base member and granules as discussed in detail above. An adhesive strip is positioned proximate an upper edge of the base member. The adhesive strip preferably permanently bonds a rigid lip to the base member. The rigid lip preferably extends beyond the upper edge of the base member. An adhesive strip is positioned on at least a portion of the bottom side of the rigid lip, and release tape is temporarily affixed to the adhesive strip. The adhesive strip is composed of an adhesive that adheres securely without an extended or heat-induced cure period. Standard adhesive may be applied to the remainder of the bottom of the base member, or further adhesive like that found in adhesive strip may be applied to the remainder of the bottom of the base member.

The various embodiments of the present shingle patch provide an improved roof repair system for repairing and/or replacing damaged shingles due to severe weather damage such as hail and the like as well as for covering exposed nails wherever they may exist on a shingled roof. These and other specific aspects and advantages of the present embodiments will be apparent to those skilled in the art after reviewing the following detailed description of the illustrative embodiments set forth below which, taken in conjunction with the accompanying drawings, disclose improved structures for the roofing industry.

DETAILED DESCRIPTION OF THE INVENTION

Figure 1:
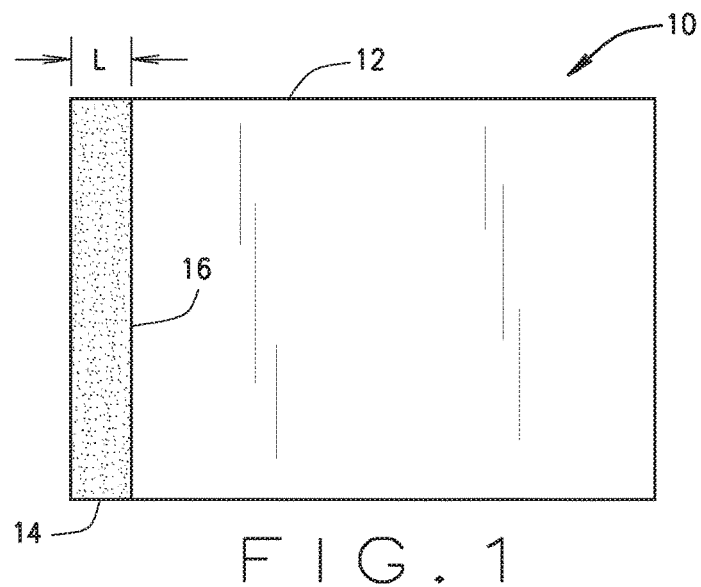
FIG. 1 is a top plan form view of one embodiment of the present shingle patch constructed in accordance with the teachings of the present invention.

The traditional way to repair asphalt roof shingles is to remove and discard the damaged shingles and then replace removed areas with new shingles. This system is not reliable, especially in the case of hail damage which may include hundreds to thousands of impact areas that need to be repaired which from a labor—time aspect would make the process cost prohibitive and cheaper to change the entire roof. Also, the process of removing damaged shingles can cause more damage to the overall roof system because roof shingles are glued together. When trying to remove those glued areas of shingles it is inevitable that some of those glued areas will be torn because they are permanently bonded by the glue and will not separate from each other without tearing or cutting. So, when the replacement shingles are installed adjacent to or over or under the shingles that were torn or damaged during the removal process there exists a high likelihood that some of those repaired areas will actually cause more damage to the roof than the hail and will leave the repaired areas with the likelihood for leaks.

Because a viable repair system for hail damaged asphalt roof shingles does not presently exist the only alternative presently available is to remove and replace the entire roof. With the changes in weather that the planet is experiencing, the number of hail storms and other tornadic events have increased exponentially and so has the number of damaged roofs. This plague of damaged roofs has caused enormous costs for insurance companies who pay to replace those roofs and to their customers who face ever increasing insurance premiums. There is an environmental issue as well when roofs are damaged before their normal life cycles creating mountains of debris in landfills, air pollution created in the manufacturing process and in the shipping process of such bulky and heavy items such as roof shingles and the need to use large quantities of resources and materials to produce those replacement products. A viable system to repair some hail damaged roof shingles is therefore vital because of the economics and environmental factors involved.

Unfortunately, even the present shingle patch repair system described herein will only be viable for somewhere between two percent and ten percent of all hail damaged roofs. The reason for this fact is that all major roof damaging hail storms will have a geographical area that can be drawn on a map. Within that geographical area there will be the most intensive damage in the epicenter with less and less damage occurring as you move away from the epicenter into the outer fringe areas of damage. The bulk of the damaged areas will be so great and the number of impacts in the thousands per roof will be so numerous that even a clever repair system will not work. Where the present systems become useful is in the outer, fringe areas of the hail storm that produce minimal damage to the shingle roofs as will be further explained.

Hail impacts on shingles will produce indentations or divots that will remove the protective granular ceramic surface. The exposed surface is not U V resistant and will rapidly decay from exposure to sunlight. These areas need to be properly repaired and covered. Presently, even in these fringe areas of minimal damage the only viable alternative to make these roofs "whole" again is to remove them and replace them. These are the circumstances that are wasteful because of the slight damage and the low number of hail impacts incurred. These fringe areas of the storms that create minimal damage to roofs are the areas that make the present repair systems invaluable and necessary to prevent waste, save money and reduce pollution as the present shingle patches will cover and protect the visible impact blemishes and will minimize further granule loss and decay.

Since the type of hail damage that the present systems are designed for is "Minimal Damage", there is not enough damage to create holes through the existing shingle roof that could cause leaks. When applying the present patches to the damaged shingles the purpose is not to prevent leaks! The damaged shingles will not leak anyway as the damage sustained to them is minimal and no puncturing through of the membrane will have occurred. The present shingle patches will cover and protect the visible impact blemishes and minimize further granule loss and decay of the base shingle membrane where granule loss has occurred and where ultra violet sun rays would otherwise degrade the asphalt based body of the shingle to the point of becoming deteriorated and producing holes as a result! The aim of the present systems is to provide a completely waterproof attachment piece over damaged shingles, however, if some water happens to migrate under the seal either through future breakdown of adhesion over time, or migration of water under the seal patch through the microscopic spaces between the existing granule surface that the patch is bonded to, is of no consequence since the present patches overlay the damaged shingle and provide an extra layer of protection.

The following shingle patches describe a way to finally be able to repair and save hail damaged shingle roofs from being replaced by simply utilizing a patch. With these new improvements, there is no need to remove damaged shingles because the present patches can be made of materials, shapes, sizes and colors that are compatible with and bonded directly to the top surface of the damaged shingles. The following shingle patches provide a much needed practical, affordable, permanent solution for hail damaged shingles.

Several embodiments of the present invention will now be explained with reference to the accompanying drawings. It will be apparent to those skilled in the art from this disclosure that the following description of the various embodiments of the present invention is provided for illustration purposes only and not for the purpose of limiting the present invention as defined by the appended claims and their equivalents.

Figure 2:
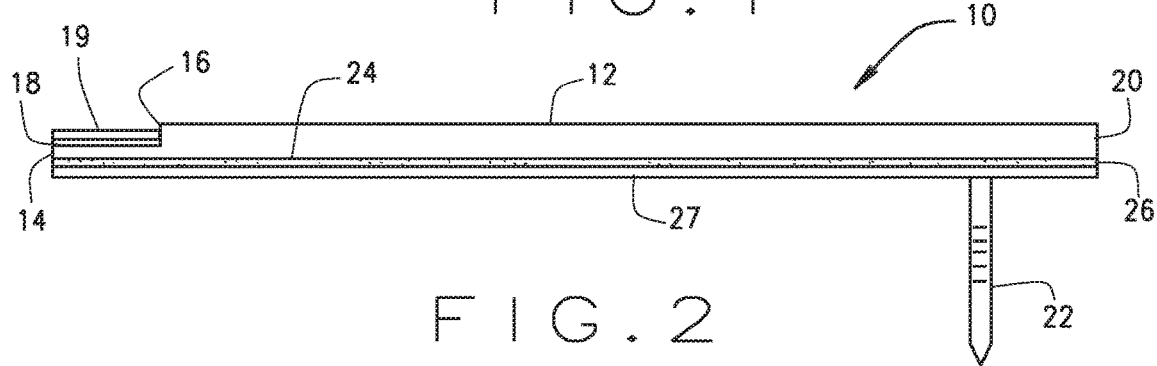
FIG. 2 is a side elevational view of the shingle patch of FIG. 1.

Referring to the drawings more particularly by reference numbers wherein like numbers refer to like parts, the number 10 in FIGS. 1 and 2 refers to one embodiment of a shingle patch used to repair damaged asphalt shingles constructed in accordance with the teachings of the present application. The shingle patch 10 includes a base member 12 sized and shaped similarly to a conventional asphalt shingle or smaller depending upon the particular application, one end portion which includes a notched portion 14 which is specifically shaped and designed for sliding under an existing shingle, such as the shingle located immediately above the damaged shingle, as will be hereinafter further explained. The notched portion 14 of base member 12 includes an overall height or thickness which is less than the overall height or thickness of the remainder of base member 12 as clearly illustrated in FIG. 2. The notched portion 14 is sized so as to be inserted under an existing shingle located immediately above the damaged shingle such that at least a portion of the existing shingle will mate with and rest on top of notched portion 14. Notched portion 14 is thinner than the remainder of base member 12 to likewise avoid creating a hump under the existing shingle when it is overlaid on top of notched portion 14. A wall or ledge portion 16 (FIG. 2) is formed between notched portion 14 and the remainder of base member 12 and functions as a stop or abutment surface for the existing shingle when overlaid on top of notched portion 14 thereby limiting the travel of the existing shingle when the notched portion 14 is inserted under the existing shingle. This arrangement also helps to prevent rain water from infiltrating under the patch 10. The overall length L of notched portion 14 can be varied depending upon the particular application and depending upon the particular size and style of asphalt shingles to be repaired.

The notched portion 14 also includes a sealant and/or adhesive 18 distributed across at least a portion of its upper surface as best illustrated in FIG. 2 for mating with and attaching to the undersurface of the existing shingle when the existing shingle is overlaid on top of notched portion 14. The sealant 18 is preferably a heat activated sealant which can be factory applied and is typically activated by the sun, although other heat sources can be applied to the notched portion 14 to activate the sealant material. Preferably, the sealant 18 covers the entire upper surface of the notched portion 14. A cellophane tape or other release material 19 can be placed over the sealant 18 so as to prevent the sealant from binding to any other material or object during shipment and storage. The tape 19 is removed prior to installing the shingle patch 10 as will be hereinafter further explained.

The opposite end portion 20 of base member 12 includes a roofing nail 22 built into the base member 12. Roofing nail 22 can be any known conventional roofing nail suitable for asphalt shingles. The roofing nail 22 is attached or integrally formed with the shingle patch base member 12 during the manufacturing process or, nail 22 can be otherwise attached to member 12 after the manufacturing process so long as nail 22 and base member 12 form a one-piece unit.

A sealant 26 is likewise associated with at least a portion of the bottom surface 24 of base member 12 as best illustrated in FIG. 2. Similar to sealant 18, sealant 26 is preferably a heat activated sealant and is likewise preferably factory applied and is typically activated by the sun. Here again, sealant 26 preferably covers the entire bottom surface 24 of base member 12. A cellophane tape or other material 27 is likewise placed over sealant 26 so as to again prevent the sealant from binding to any other material or object during shipment and storage. The tape 27 is removed prior to installing the shingle patch 10 over a damaged shingle as will be hereinafter further explained.

The top portion of base member 12 includes colored granules (not shown) that are embedded into the patch material so as to match the color of the existing damaged shingle to be repaired. In this regard, the present shingle patch 10 can be produced in multiple colors so as to match the known existing asphalt shingle colors present in the marketplace, or the base member 12 can be color-coordinated with the shingles to be repaired on-site in the field by using a pre-made shingle base member 12 with no color granules associated therewith and thereafter affixing colored granules to the member 12 in the field so as to match the existing colors of the roof to be repaired. Colored granules can be applied to any portion or the entire top surface of base member 12 in a known conventional manner using appropriate adhesives and/or other sealing materials.

Figure 3:
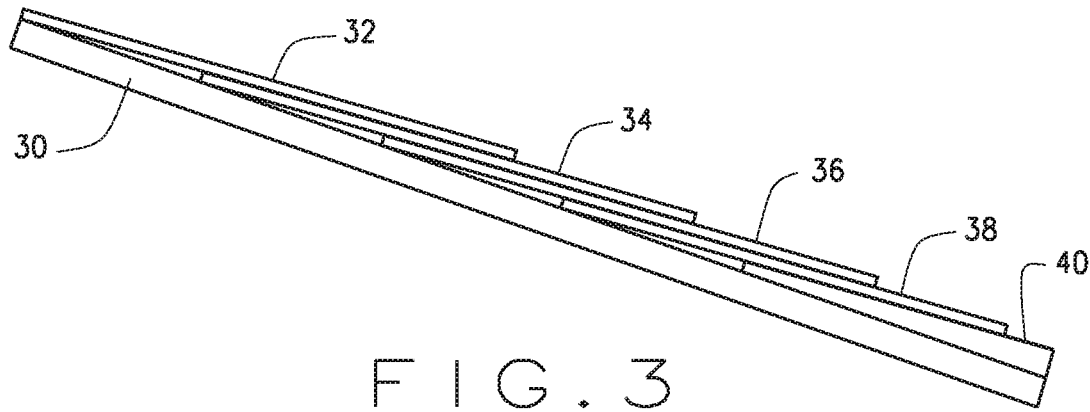
FIG. 3 is a side elevational view of a typical shingled roof showing the overlaying pattern arrangement of shingles before the present shingle patch is applied for repair.
Figure 4:
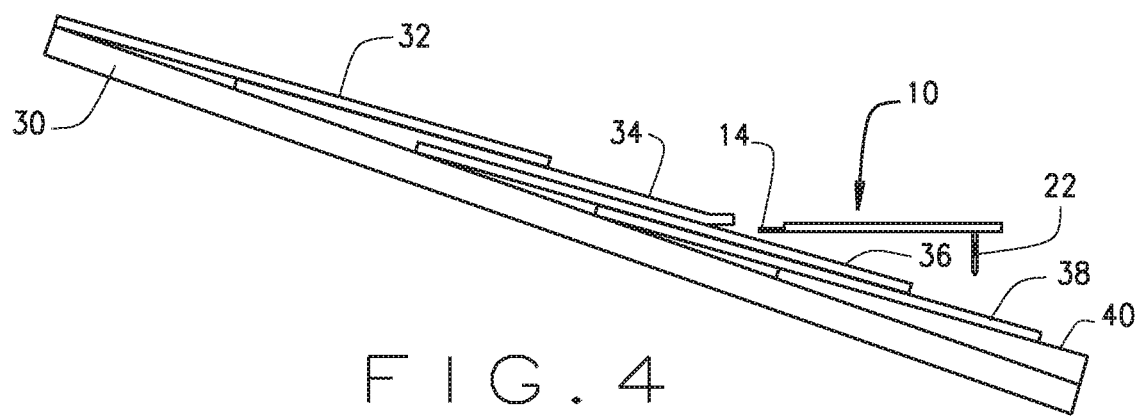
FIG. 4 is a side elevational view similar to FIG. 3 showing the present shingle patch of FIGS. 1 and 2 in exploded view prior to insertion for repair.
Figure 5:
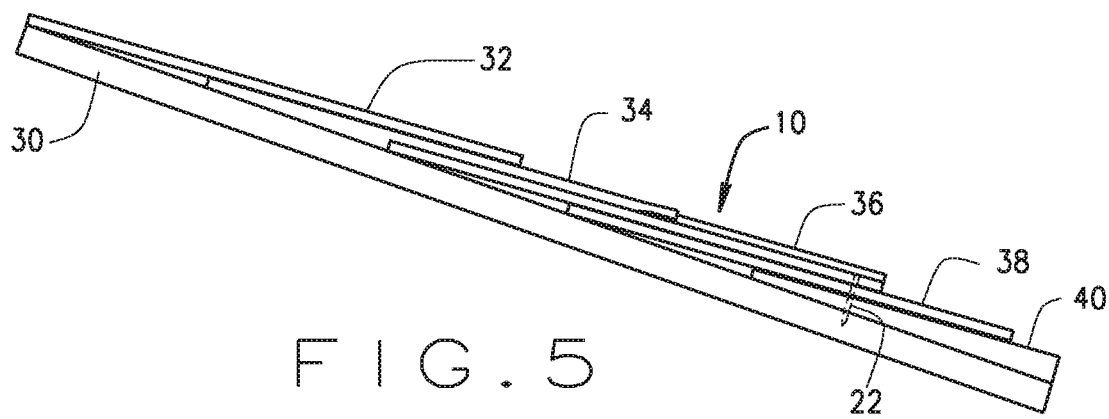
FIG. 5 is a side elevational view similar to FIG. 4 showing the present shingle patch of FIGS. 1 and 2 positioned and attached to the existing roof structure and overlaying the damaged shingle.

FIG. 3 illustrates a typical asphalt shingled roof wherein the underlying roof structure 30 is typically plywood or some other wood product. Typical asphalt shingles 32, 34, 36, 38 and 40 are overlaid in a typical overlapping pattern as illustrated in FIG. 3. Assuming that asphalt shingle 36 is damaged by hail or any other weather event, FIGS. 4 and 5 illustrate the method for repairing damaged asphalt shingle 36 using the present shingle patch 10. Repair will typically begin as illustrated in FIG. 4 where a technician will lift the bottom edge of the shingle that lies immediately above the damaged shingle. As illustrated in FIG. 4, the bottom edge of shingle 34 lies just one row above the damaged shingle 36. Lifting of the bottom edge of shingle 34 can be accomplished with known tools in the trade. Once the bottom edge of shingle 34 is lifted as illustrated, the technician will remove the release tape 19 and 27 associated with notched portion 14 and the bottom surface 24 of base member 12 respectively and then slide notched portion 14 of base member 12 under the raised portion of shingle 34. The raised shingle portion of shingle 34 is then lowered onto notched portion 14 and the heat activated or other sealant 18 associated therewith. As stated, prior to inserting notched portion 14 under the raised shingle 34, the release tape 27 associated with the bottom portion 24 of shingle patch 10 is likewise removed prior to installation.

Once notched portion 14 is inserted under the existing adjacent shingle 34, the opposite end portion 20 of base member 12 housing the integrated roofing nail 22 is then nailed to the damaged shingle 36 as best illustrated in FIG. 5. Once nailed, the undersurface of base member 12 is sealed directly to the damaged shingle 36 via the sealant 26 located across its bottom surface. Once completed, the shingle patch 10 will overlay the damaged shingle 36 as illustrated in FIG. 5 and the colored granules associated with the top surface of base member 12 will match the color scheme of the other shingles 32, 34, 36, 38 and 40 associated with the roof structure. The heat activated sealant 18 and 26 will bind to their respective mating surfaces by the heat generated from the sun if a heat activated sealant is used. Other heat sources can be used to immediately activate the sealant 18 and 26 if so desired. This could include using heat blowers, or using a different type of sealant. Since the damaged shingle 36 remains in place, the present shingle patch 10 provides an extra layer of protection since the damaged shingle 36 still provides some protection to the roof structure. Depending upon the size of the damaged area associated with shingle 36, shingle patch 10 can be sized and dimensioned so as to adequately overlay the damaged area of shingle 36. In this regard, shingle patch 10 can merely cover a portion of shingle 36 or, in other embodiments, it can cover substantially all of shingle 36 if so desired. Shingle patch 10 can be made according to any dimensions up to and including covering the entire damaged asphalt shingle.

Figure 6:
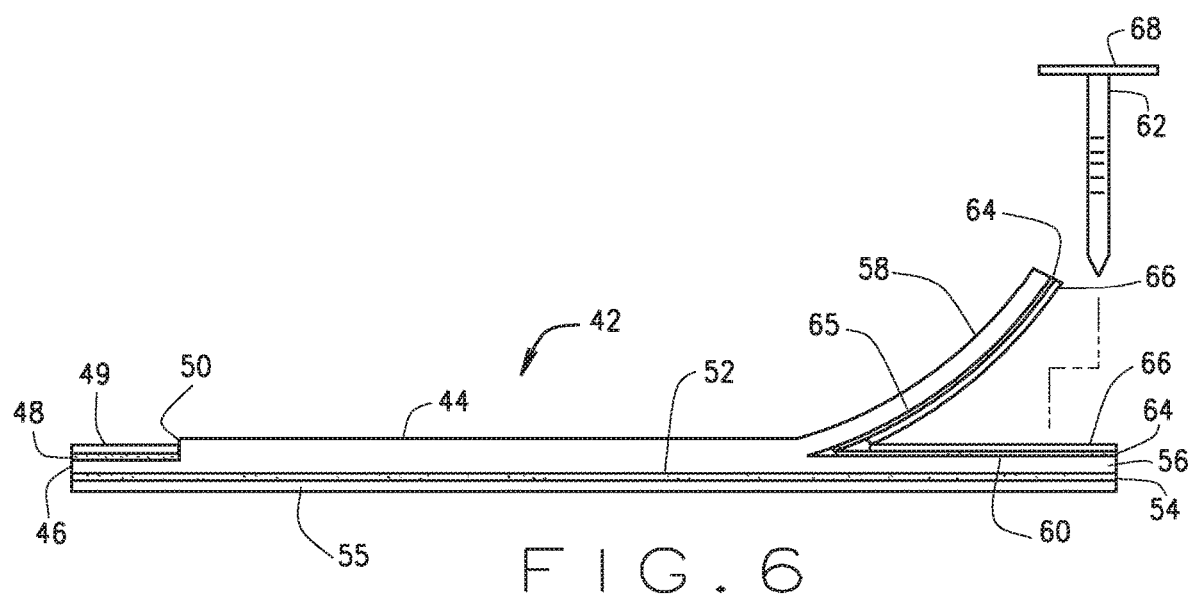
FIG. 6 is a side elevational view of another embodiment of the present shingle patch constructed in accordance with the teachings of the present invention.

FIG. 6 illustrates another embodiment 42 of the present shingle patch, namely, shingle patch 42. Patch 42 includes as a base member 44 again having a notched portion 46 associated with one end portion thereof which is constructed substantially similar to notched portion 14 associated with shingle patch 10 including having a sealant 48 covering at least a portion of the upper surface of notched portion 46 and likewise including an abutment surface, ledge or stop portion 50 for positioning and overlaying the existing adjacent shingle which will be positioned on top of notched portion 46 as previously explained. Shingle patch 42 likewise includes colored granules (not shown) embedded into its top surface to match the color scheme of the roof shingles to be repaired, and a sealant 54 covering at least a portion of the bottom surface 52 of base member 44 similar to sealant 26 associated with shingle patch 10.

Shingle patch 42 differs from shingle patch 10 in that it does not include an integrated roofing nail. Instead, the opposite end portion 56 of base member 44 includes a flap portion 58 that can be moved or lifted away from its mating surface 60 as best illustrated in FIG. 6 so that a standard roofing nail 62 can be nailed through the mating surface 60 of base member 44 into the underlying damaged shingle as will be hereinafter explained. The flap portion 58 includes a sealant 64 associated with its inner surface 65 and its mating base portion 60 can likewise optionally include a sealant 64 as well for mating with and sealing with flap portion 58. Both flap surfaces 65 and 60 covered with a sealant 64 are likewise covered with a cellophane tape or other release tape 66 so as to prevent these mating surfaces from bonding together until required. Again, sealant 64 can be a heat activated sealant. Flap portion 58 should be sufficiently large enough so as to allow a roofing technician to hammer a conventional roofing nail through base member mating surface 60 and end portion 56 so as to complete the attachment of shingle patch 42 to the damaged shingle.

Shingle patch 42 is attached overlaying a damaged shingle in a manner substantially similar to shingle patch 10 as illustrated and discussed with respect to FIGS. 3-5. In this regard, the notched portion 46 of shingle patch 42 is again inserted under an existing shingle located immediately above the damaged shingle as discussed above with respect to shingle patch 10. Here again, the release tape 49 covering sealant 48 is removed prior to insertion under the existing shingle. In similar fashion, the release tape 55 associated with sealant 54 is likewise removed prior to insertion of the notched portion 46 under the existing shingle located immediately above the damaged shingle to be repaired. Once the notched portion 46 is properly positioned, shingle patch 42 is lowered and positioned so as to overlay the damaged area of the damaged shingle and the sealant 54 associated with the bottom surface 52 of shingle patch 42 is then allowed to seal directly to the damaged shingle via the sealant 54 as previously explained. At this point, the flap portion 58 is lifted, the release tape 66 associated with both sealant surfaces 64 is removed and a standard roofing nail 62 is then nailed through the mating surface 60 of base member 44 and through the damaged shingle located below. Once the standard roofing nail 62 is hammered into place, the flap portion 58 is lowered and the sealant 64 associated with flap portion 58 and/or mating surface 60 are allowed to bond as previously explained.

Importantly, flap portion 58 covers the head 68 of roofing nail 62 and serves as a seal thereby preventing the roofing nail 62 from being exposed to the elements. Again, the respective heat activated sealants 48, 54 and 64, if used, can all be activated either by the sun or by other heat sources thereby bonding the shingle patch 42 to the existing damaged shingle, the adjacent existing shingle, and the various portions of the mating flap portion 58. Here again, shingle patch 42 overlays the damaged shingle and provides an extra layer of protection to the roof structure. The method of positioning and attaching the shingle patch 42 over a damaged shingle is substantially identical to the procedure outlined with respect to shingle patch 10 as illustrated in FIGS. 3-5 except for using a standard roofing nail 62 as explained above. Like shingle patch 10, shingle patch 42 can be sized and dimensioned as previously explained and depending upon the particular application.

Figure 7:
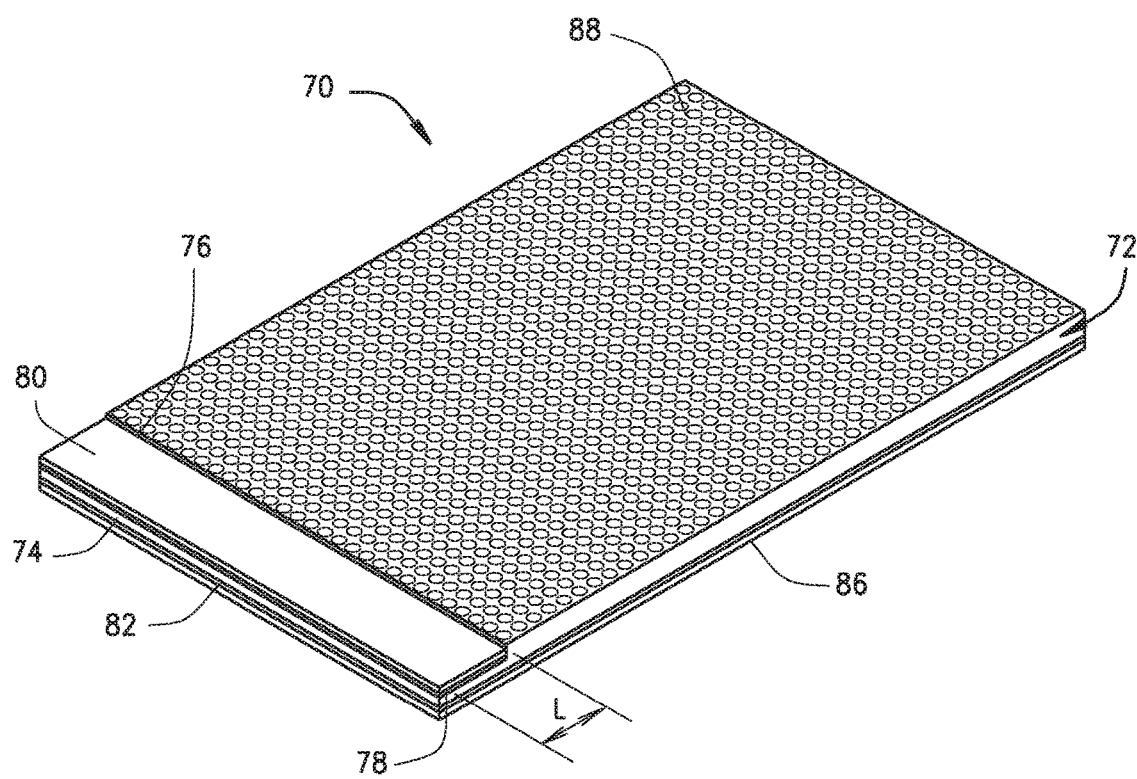
FIG. 7 is a perspective view of an alternative embodiment of the shingle patches of FIGS. 1 and 6 constructed in accordance with the teachings of the present invention.
Figure 8:
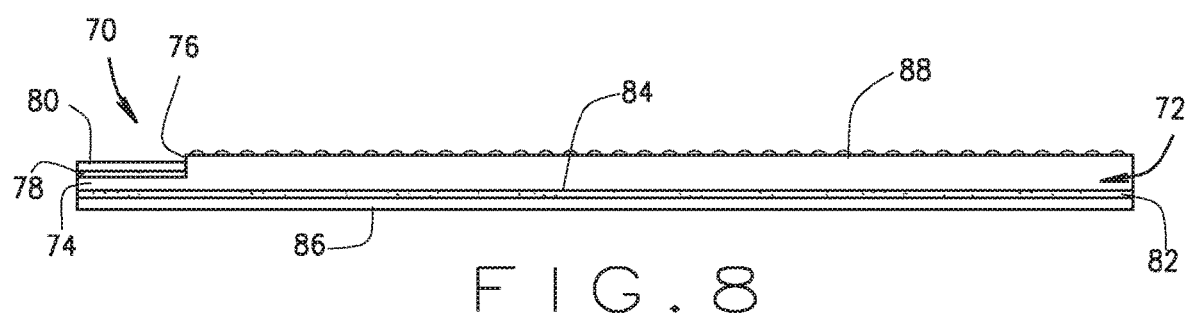
FIG. 8 is a side elevational view of the shingle patch of FIG. 7.

FIGS. 7 and 8 refer to another embodiment of a shingle patch 70 used to repair damaged asphalt shingles constructed in accordance with the teachings of the present application. The shingle patch 70 is substantially similar to the shingle patch 10 described above, though the shingle patch 70 does not include a nail like roofing nail 22 described and shown above. Like the shingle patch 10, the shingle patch 70 includes a base member 72 sized and shaped similarly to a conventional asphalt shingle or smaller depending upon the particular application. The base member 72 can be manufactured from materials such as for example, a fiberglass asphalt type shingle material or an SBS modified asphalt shingle material, and includes one end portion which includes a notched portion 74 specifically shaped and designed for sliding under an existing shingle, such as the shingle located immediately above the damaged shingle, as described above. The notched portion 74 of base member 72 also includes an overall height or thickness which is less than the overall height or thickness of the remainder of base member 72 as clearly illustrated in FIG. 8. The notched portion 74 is sized so as to be inserted under an existing shingle located immediately above the damaged shingle such that at least a portion of the existing shingle will mate with and rest on top of notched portion 74 in a manner substantially similar to the notched portion 14 of the shingle patch 10. Notched portion 74 is thinner than the remainder of base member 72 to likewise avoid creating a hump under the existing shingle when it is overlaid on top of notched portion 74. A wall or ledge portion 76 (FIG. 8) is formed between notched portion 74 and the remainder of base member 72 and functions as a stop or abutment surface for the existing shingle when overlaid on top of notched portion 74 thereby limiting the travel of the existing shingle when the notched portion 74 is inserted under the existing shingle. This arrangement also helps to prevent rain water from infiltrating under the patch 70. The overall length L of notched portion 74 can be varied depending upon the particular application and depending upon the particular size and style of asphalt shingles to be repaired.

The notched portion 74 also includes a sealant and/or adhesive 78 distributed across at least a portion of its upper surface as best illustrated in FIG. 8 for mating with and attaching to the undersurface of the existing shingle when the existing shingle is overlaid on top of notched portion 74. The sealant 78 is preferably a heat activated sealant which can be factory applied and is typically activated by the sun, although other heat sources can be applied to the notched portion 74 to activate the sealant material. Preferably, the sealant 78 covers the entire upper surface of the notched portion 74. A cellophane tape or other release material 80 can be placed over the sealant 78 so as to prevent the sealant from binding to any other material or object during shipment and storage. The tape 80 is removed prior to installing the shingle patch 70 as will be hereinafter further explained.

A sealant 82 is likewise associated with at least a portion of a bottom surface 84 of base member 72 as best illustrated in FIG. 8. Similar to sealant 78, sealant 82 is preferably a heat activated sealant and is likewise preferably factory applied and is typically activated by the sun or by other mechanical heat source means such as a heat blower. Here again, sealant 82 preferably covers the entire bottom surface 84 of base member 72. A cellophane tape or other material 86 is likewise placed over sealant 82 so as to again prevent the sealant from binding to any other material or object during shipment and storage. The tape 86 is removed prior to installing the shingle patch 70 over a damaged shingle as will be hereinafter further explained.

The top portion of base member 72 again includes colored granules 88 that are embedded into the patch material so as to match the color of the existing damaged shingle to be repaired. In this regard, the present shingle patch 70 can be produced in multiple colors so as to match the known existing asphalt shingle colors present in the marketplace. In an alternative embodiment such as shown for the base member 12 of the shingle patch 10, the base member 72 can be color-coordinated with the shingles to be repaired on-site in the field by using a pre-made shingle base member with no color granules associated therewith and thereafter affixing colored granules to the member 72 in the field so as to match the existing colors of the roof to be repaired. Colored granules can be applied to any portion or the entire top surface of base member 72 in a known conventional manner using appropriate adhesives and/or other sealing materials.

The shingle patch 70 may be fitted to and adhered to a damaged shingle in a manner substantially similar to that described for shingle patch 10 and shown in FIGS. 3-5 except it does not use the roofing nail 22 to nail the shingle patch 70 to the damaged shingle 36. Instead the sealant 82 on the bottom surface 84 of the base member 72 provides sufficient adhesive force to bond the shingle patch 70 to the damaged shingle 36. The roofing nail 22 is not necessary.

It is also recognized and anticipated that a factory or field applied adhesive that is aggressive enough to be applied at acceptable, ambient temperature using only sufficient downward pressure to laminate or attached the patch 70 to the existing roof can also be utilized. A small roller tool made from metal, rubber, wood or other similar material can be used to apply a concentrated pressure to the patch 70 to ensure adequate attachment. This attachment should provide a permanent waterproof bonding between the patch 70 and the existing roof. Other adhesives or sealants may also be used.

The patch 70 can be custom trimmed to fit the particular application at the factory, or by the installer in the field, to repair shingles of different shapes and sizes as well as lip and ridge and any other accessory products. The patch 70 is installed without nails as the adhesives alone provides the permanent and waterproof bonding together of all surfaces. The patch 70 can also be used to cover exposed nails such as those that exist as a result of headwalls, the final rows of field shingles on shed roof style roofs, on final ridge caps, and other applications.

It is also recognized and anticipated that the notched portion 74 can be formed by omitting a swath of granules 88 along the top portion of the patch or by mechanically removing the granules from the top surface with a tool similar to a power router or a power planer. In both cases, the notched portion 74 should have an area free of granules for a width of from at least one quarter (¼) of an inch to three quarters (¾) of an inch. It is also recognized that a portion of the base member 72 may also have to be removed, depending upon the overall size of the granules 88, in order to form a sufficient notch.

Figure 9:
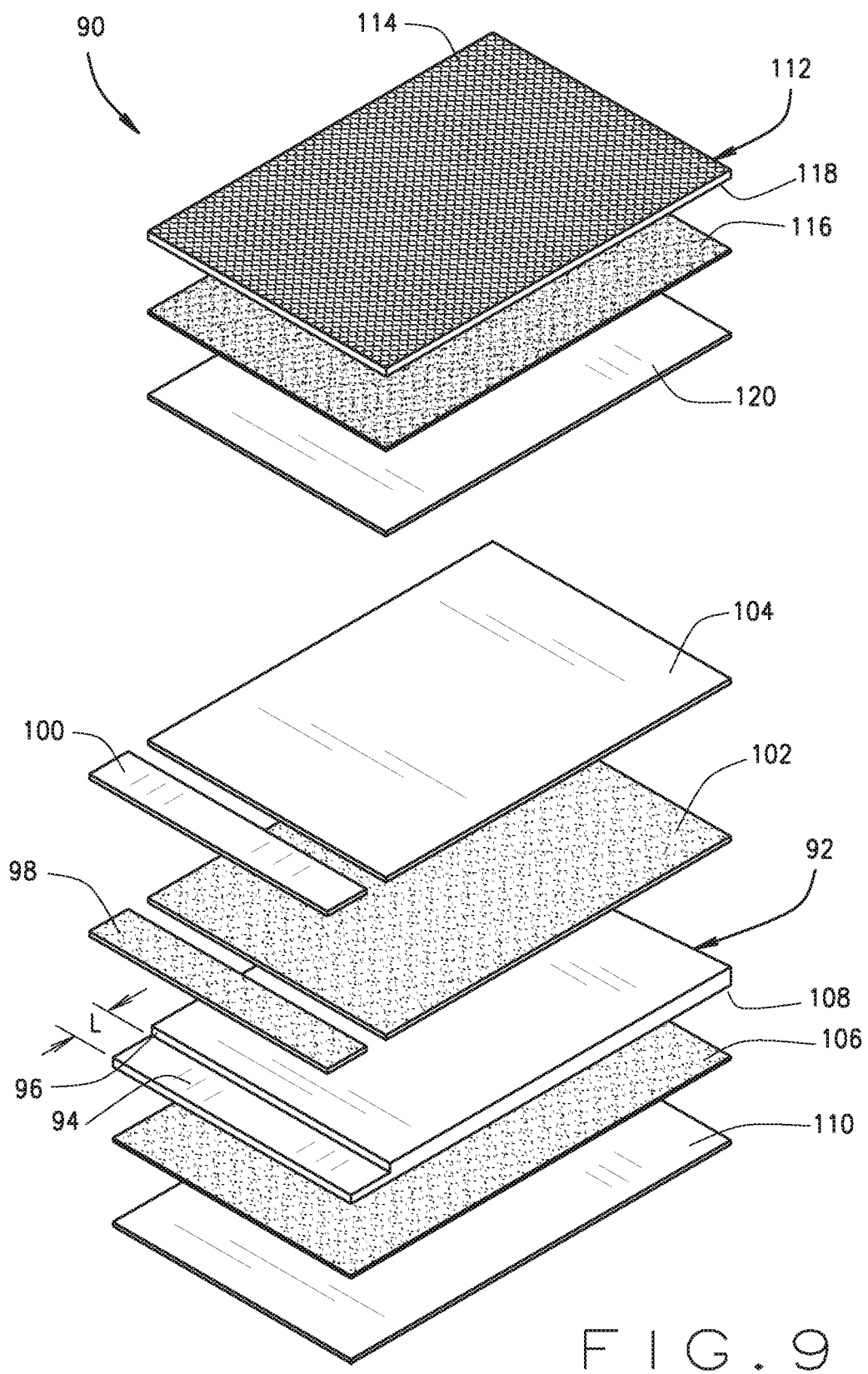
FIG. 9 is an exploded perspective view of a two-piece embodiment of the present shingle patch constructed in accordance with the teachings of the present invention.
Figure 10:
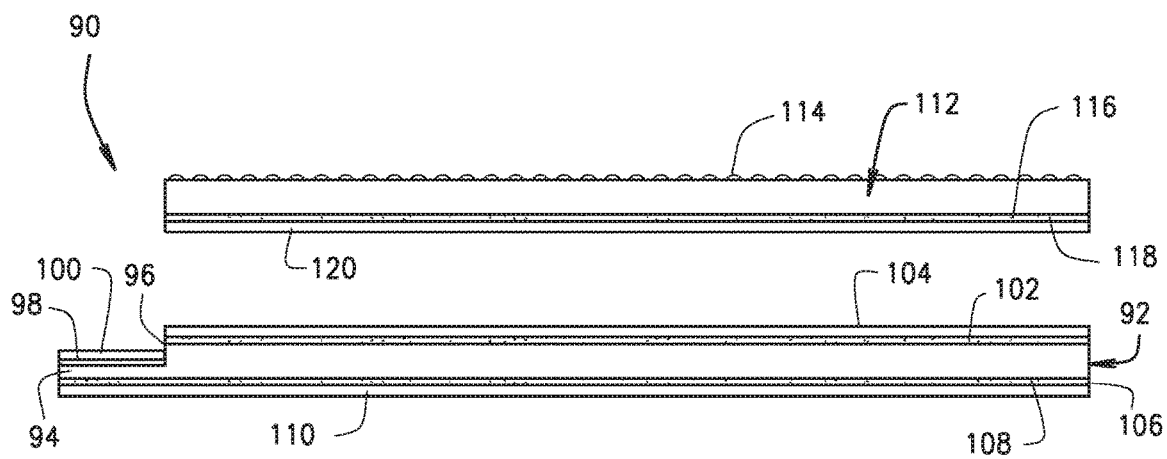
FIG. 10 is a side elevational view of the two pieces that make up the shingle patch of FIG. 9.

Turning now to FIGS. 9 and 10, yet another embodiment of a shingle patch 90 is provided that likewise is used to repair damaged asphalt shingles constructed in accordance with the teachings of the present application. The shingle patch 90, like the shingle patch 70, does not include a nail like roofing nail 22 described and shown herein in reference to the shingle patch 10. However, the shingle patch 90 does include two parts, each of which are described in detail below. The shingle patch 90 includes a lower base member 92 sized and shaped similarly to a conventional asphalt shingle or smaller depending upon the particular application. The lower base member 92 includes one end portion having a notched portion 94 specifically shaped and designed for sliding under an existing shingle, such as the shingle located immediately above the damaged shingle, as described above in relation to the other shingle patches 10, 70. The notched portion 94 of lower base member 92 also includes an overall height or thickness less than the overall height or thickness of the remainder of lower base member 92 as clearly illustrated in FIG. 10. Like the notched portion 74, the notched portion 94 is thinner than the remainder of lower base member 92 to likewise avoid creating a hump under the existing shingle when it is overlaid on top of notched portion 94. A wall or ledge portion 96 shown in FIGS. 9 and 10 is also provided that performs substantially the same function as the ledge portions associated with the shingle patches 10, 70. The ledge portion 96 limits the travel of the existing shingle when the notched portion 94 is inserted under the existing shingle. This arrangement also helps to prevent rain water from infiltrating under the patch 90. The overall length L of notched portion 94 can, like the other shingle patches 10 and 70, be varied depending upon the particular application and depending upon the particular size and style of asphalt shingles to be repaired.

The notched portion 94 also includes a sealant and/or adhesive 98 distributed across at least a portion of its upper surface as best illustrated in FIG. 9 for mating with and attaching to the undersurface of the existing shingle when the existing shingle is overlaid on top of notched portion 94. The sealant 98 is preferably a heat activated sealant which can be factory applied and is typically activated by the sun, although other heat sources can be applied to the notched portion 94 to activate the sealant material. Preferably, the sealant 98 covers the entire upper surface of the notched portion 94. A cellophane tape or other release material 100 can be placed over the sealant 98 so as to prevent the sealant from binding to any other material or object during shipment and storage. The tape 100 is removed prior to installing the shingle patch 90 as will be hereinafter further explained.

Unlike the other shingle patches 10, 70, the upper portion of the lower base member 92 not including the notched portion 94 is also provided with a sealant and/or adhesive 102 distributed across at least a portion of its upper surface (best illustrated in FIG. 9) for mating with and attaching to the undersurface of an upper base member, the structure of which is described in greater detail below. The sealant 102 is preferably heat activated like the sealant 98 and covers the entirety of the upper surface of the lower body member 92 not including the notched portion 94. A cellophane tape or other release material 104 may also be placed over the sealant 102 so as to prevent the sealant 102 from binding to any other material or object during shipment and storage. The tape 104 is removed prior to attaching to the undersurface of the upper base member, the structure of which will be hereinafter further explained.

A sealant 106 is likewise associated with at least a portion of a bottom surface 108 of lower base member 92 as best illustrated in FIG. 10. The sealant 106 is substantially similar to the sealants 98, 102 described above and preferably covers the entire bottom surface 108 of lower base member 92. A cellophane tape or other material 110 is also placed over sealant 106 so as to again prevent the sealant from binding to any other material or object during shipment and storage. The tape 110 is removed prior to installing the lower base member 92 over a damaged shingle.

The shingle patch 90 further includes an upper base member 112 that is adhered to the lower base member 92 when the shingle patch 90 is assembled. The upper base member 112 preferably is sized and shaped substantially similarly to the upper surface of the lower base member 92 not including the notched portion 94. The top portion of upper base member 112 includes colored granules 114 that are embedded into the patch material so as to match the color of the existing damaged shingle to be repaired. In this regard, the present shingle patch 90 can be produced in multiple colors so as to match the known existing asphalt shingle colors present in the marketplace. In an alternative embodiment such as shown for the base member 12 of the shingle patch 10, the upper base member 112 can be color-coordinated with the shingles to be repaired on-site in the field by using a pre-made shingle base member with no color granules associated therewith and thereafter affixing colored granules to the upper base member 112 in the field so as to match the existing colors of the roof to be repaired. Colored granules can be applied to any portion or the entire top surface of base member 112 in a known conventional manner using appropriate adhesives and/or other sealing materials.

A sealant 116 is likewise associated with at least a portion of a bottom surface 118 of upper base member 112 as best illustrated in FIG. 10. The sealant 116 is substantially similar to the sealants 98, 102, 106 described above and preferably covers the entire bottom surface 118 of upper base member 112. A cellophane tape or other material 120 is also placed below sealant 116 so as to again prevent the sealant from binding to any other material or object during shipment and storage. The tape 120 is removed prior to attaching the upper base member 112 to the lower base member 92 to install the shingle patch 90.

The shingle patch 90 is fitted and adhered to a damaged shingle in a manner somewhat different than that described for shingle patch 10 and shown in FIGS. 3-5. Once the bottom edge of shingle 34 is lifted as illustrated in FIG. 4, a technician will again remove the release tape 100 and 110 associated with notched portion 94 and the bottom surface 108 of lower base member 92, respectively, and then slide notched portion 94 of lower base member 92 under the raised portion of shingle 34. The raised shingle portion of shingle 34 is then lowered onto notched portion 94 and the heat activated or other sealant 98 associated therewith. With the release tape 110 associated with the bottom portion 108 of the lower base member 92 removed, the sealant 106 may also be adhered to the damaged shingle, thus securing the lower base member 92 to the damaged shingle. Next, the sealing tape 104 covering remaining sealant 102 located on the upper surface of lower base member 92 may be removed. The sealing tape 120 covering the sealant 116 located on the bottom surface of upper base member 112 may likewise be removed, and the upper base member 112 may be attached to the lower base member 92 by way of the bond formed between sealants 116, 102 respectively.

Now assembled, the shingle patch 90 will overlay the damaged shingle 36 as illustrated in FIG. 5 and the colored granules 114 associated with the top surface of the upper base member 112 will match the color scheme of the other shingles such as shingles 32, 34, 36, 38 and 40 associated with the roof structure. The heat activated sealants 98, 102, 106, and 116 will bind to their respective mating surfaces by the heat generated from the sun, or other mechanical heat source means, if a heat activated sealant is used. Other heat sources can be used to immediately activate the sealants if so desired (e.g., using heat blowers or a different type of sealant).

It is also recognized and anticipated that the adhesives utilized with the bottom surface 108 of the lower base member 92, the upper surface of the lower base member 92, and the bottom surface 118 of the upper base member 112 may have different options for using adhesives that will supply a permanent and waterproof bonding both between the respective base members 92 and 112 as well as between the bottom surface 108 of lower base member 92 and the damaged shingle. These various options may include, for example, a factory or field applied adhesive that can be used with any of the above referenced surfaces that is aggressive enough to be applied at acceptable, ambient temperatures using only sufficient downward pressure so as to laminate or attach both the lower base member 92 to the damaged shingle and/or bonding the respective lower and upper base members 92 and 112 together. A small roller tool made from metal, rubber, wood or other suitable materials can be used to apply a concentrated pressure to the respective base members 92 and 112 to assure adequate attachment therebetween.

Still further, it is also recognized and anticipated that a factory or field applied adhesive that is sufficiently aggressive enough to bond to adjoining surfaces such as the bottom surface 118 of upper base member 112 to the upper surface of lower base member 92 may only need be applied to one of the two respective surfaces instead of applying an adhesive to both the bottom surface of upper base member 112 and the upper surface of lower base member 92. In this situation, only one of the respective surfaces need have an adhesive associated therewith.

The two-piece patch 90 can likewise be trimmed to fit the particular application at the factory, or it can be trimmed by the installer in the field, to repair shingles of different shapes and sizes as well as hip and ridge and other accessory products. Although the two-piece patch 90 is designed to be installed without nails as the adhesives associated with patch 90 alone provide the permanent and waterproof bonding necessary between all surfaces, patch 90 can likewise be utilized with nails. If nails are to be used, they will only be used on the lower base member 92 so that the upper base member 112 will then cover and seal all of the nail heads associated with the lower base member 92. The patch 90 can also be used to cover exposed nails such as those that exist as a result of headwalls, the final rows of field shingles on shed roof style roofs, on ridge caps, and on other applications.

Figure 11:
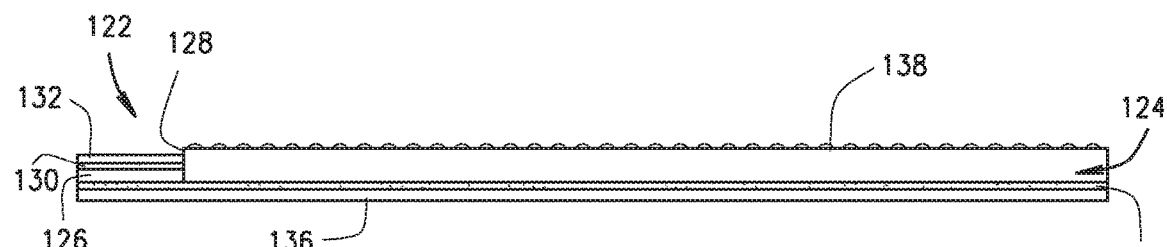
FIG. 11 is a side elevational view of still another embodiment of a shingle patch similar to the shingle patch of FIGS. 7 and 8 constructed in accordance with the teachings of the present invention.

It is also recognized and anticipated that the notched portion 74 associated with shingle patch 70 can also be formed by a very thin sheet of material such as a thin sheet of sheet metal, aluminum, copper, plastic or other suitable material which is merely attached to base member 72 via any suitable means of attachment such as a sealant, adhesive, or other attachment mechanism as best illustrated in FIG. 11. In this particular embodiment 122 (FIG. 11), shingle patch 122 is substantially similar to shingle patch 70 and includes a base member 124 having a thin sheet of material 126 associated with one end portion thereof which again is specifically shaped and designed for sliding under an existing shingle such as the shingle located immediately above the damaged shingle as described above. The sheet of material 126 can extend outwardly from one end portion of the base member 124 as illustrated in FIG. 11 or it can be overlapped with the bottom surface of the base member 124 and attached thereto in a conventional manner. The sheet of material 126 is relatively thin so that the existing shingle does not have to be lifted or separated from the roof structure nearly as much when the thin sheet of material 126 is inserted under the existing shingle located immediately above the damaged shingle as compared to inserting notch 74 under the existing shingle. This helps to preserve the seal between the existing shingle and the roof structure and further prevents leakage around the respective end portions of the existing shingle when the sheet of material 126 is inserted under such existing shingle. In all other respects, the shingle patch 122 is substantially similar to shingle patch 70 and includes a wall or lip portion 128, a sealant and/or adhesive 130 distributed across at least a portion of the upper surface of the thin sheet of material 126 for mating with and attaching to the undersurface of the existing shingle, a cellophane tape or other release material 132 placed over the sealant 130, a sealant 134 associated with at least a portion of the bottom surface of the base member 124, and a cellophane tape or other material 136 covering the sealant 134 as previously explained. The top portion of base member 124 again includes colored granules 138 that are embedded into or otherwise formed or attached to the patch material so as to match the color of the existing damaged shingle to be repaired.

Figure 12:
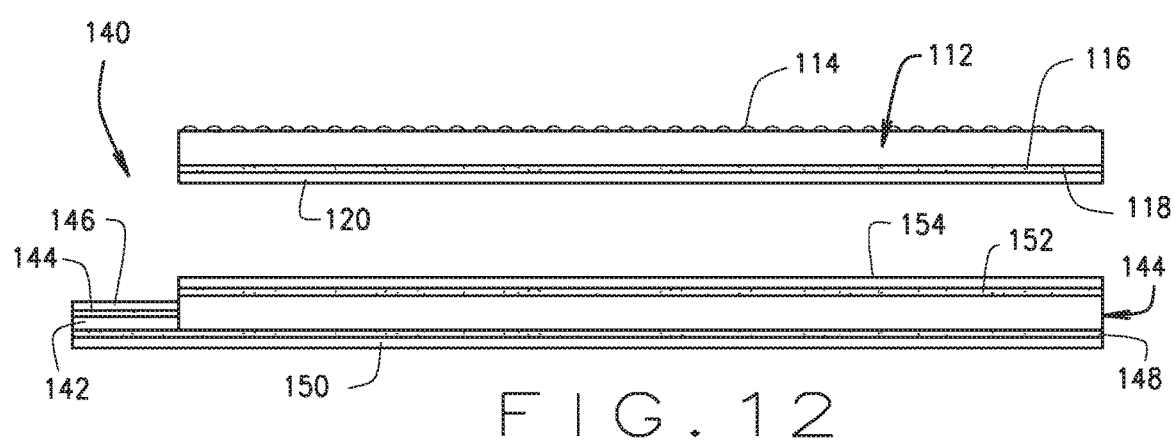
FIG. 12 is a side elevational view of still another embodiment of a two-piece shingle patch similar to the shingle patch of FIGS. 9 and 10 constructed according to the teachings of the present invention.

Use of a thin sheet of material such as the sheet of material 126 can likewise be utilized with the lower base member 92 associated with the two-piece shingle patch 90 (FIGS. 9 and 10) as again illustrated in FIG. 12. In this particular embodiment 140, the notch 94 associated with the lower base member 92 is again replaced with a very thin piece of material 142. This again can be attached to the lower base member 144 via any suitable means as explained above. Here again, the thin piece of material 142 is shaped and designed to be inserted under the existing shingle located immediately above the damaged shingle and, because the sheet of material 142 is substantially thinner than the notched portion 94, insertion of the thin sheet of material 142 under the existing shingle requires less lifting of the existing shingle and thereby requires less deterioration of the seal between the existing shingle and the roof structure. As with embodiment 90, the thin sheet of material 142 may likewise include a sealant and/or adhesive 144 distributed across at least a portion of its upper surface as best shown in FIG. 12 and it may likewise include a cellophane tape or other release material 146 placed over the sealant 144 so as to again prevent the sealant from binding to any other material or object during shipment and storage. In similar fashion, the lower base member 144 likewise includes a sealant and/or adhesive 148 distributed over at least a portion of its lower surface for attaching to the damaged shingle and it may likewise include a cellophane tape or other release material 150 placed over the sealant 148. The upper surface of lower base member 144 likewise includes a sealant and/or an adhesive 152 distributed across at least a portion of its upper surface for mating with and attaching to the undersurface of the upper base member 112 and a cellophane tape or other release material 154 may likewise cover adhesive or sealant 152. The upper base member 112 is substantially identical to the upper base member associated with the two-piece shingle patch 90 illustrated in FIG. 10.

Figure 13:
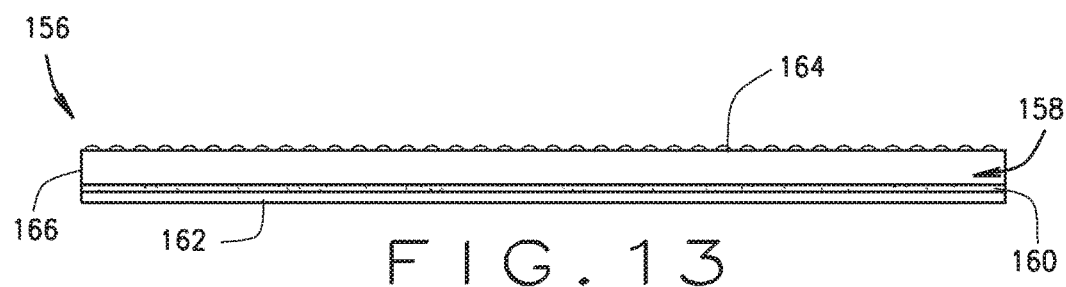
FIG. 13 is a side elevational view of yet another embodiment of a one-piece shingle patch constructed according to the teachings of the present invention.
Figure 16:
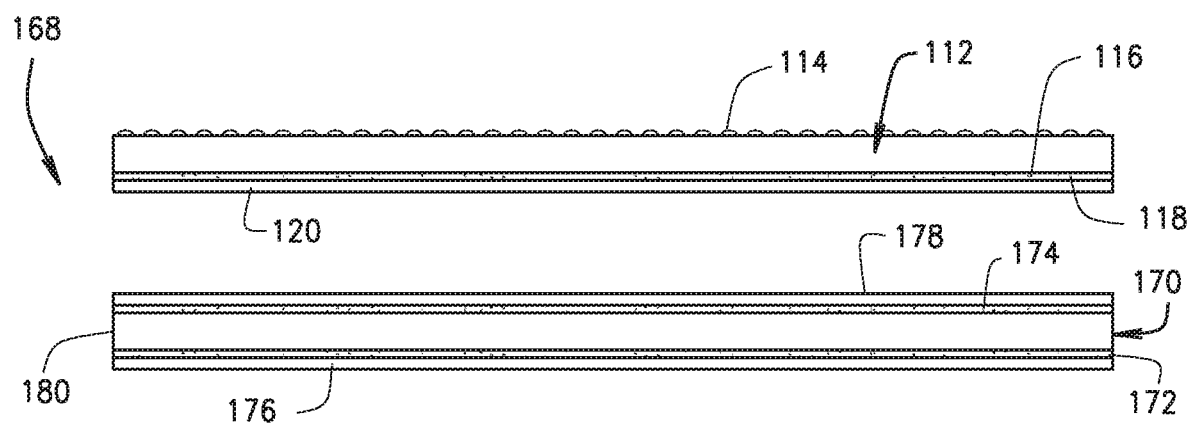
FIG. 16 is a side elevational view of yet another embodiment of a two-piece shingle patch constructed according to the teachings of the present invention.

FIGS. 13 and 16 illustrate still other embodiments of the present one-piece and two-piece shingle patch. More particularly, FIG. 13 illustrates a one-piece shingle patch 156 which is substantially similar to shingle patch 70 (FIGS. 7 and 8) except that notch portion 74 has been eliminated. In this particular embodiment, the patch 156 includes a base member 158 having a sealant and/or adhesive 160 distributed across at least a portion of its lower surface for mating with and attaching to the damaged shingle and further includes a cellophane tape or other release material 162 covering the adhesive 160 for reasons as previously explained. Similar to shingle patch 70, the top surface of base member 158 likewise includes colored granules 164 that are either embedded or otherwise attached to the patch material so as to match the color of the existing damaged shingle to be repaired. In this particular embodiment, the shingle patch 156 is placed over the damaged shingle and its one end portion 166 is placed in abutting relationship to the edge portion of the existing shingle located immediately above the damaged shingle. In this embodiment, the adhesive 160 provides sufficient adhesive force to bond the shingle patch 156 to the damaged shingle and the existing shingle located immediately above the damaged shingle does not have to be lifted or otherwise separated from the roofing structure to complete the repair. Shingle patch 156 is applied directly over the damaged shingle, or over exposed nails, and can be trimmed to fit the particular damaged shingle either at the factory, or by the installer in the field. Here again, the adhesive 160 provides sufficient adhesive force to bond the shingle patch 156 to the damaged shingle.

There will be different adhesive methods used to glue these patches to the damaged roofs. For example, the following adhesives could be used with shingle patches 70, 122, and 156:

1) A modified bitumen adhesive similar to the type that is used by shingle manufactures to bond the components of "Laminated Shingles" together in the manufacturing process and the same type of adhesive that is also used by shingle manufacturers to provide the sealing adhesive that is activated by the sun after the shingles are installed. This adhesive is highly aggressive, long lasting and glues the separate shingles together when the hot sun softens this material to the point that it will become like a "Hot Glue". This type of material can be applied to the underside of above referred patches and to the notched areas of the notched type patches in sufficient quantities as to accomplish up to an 100% compatible bonding medium between the asphalt shingle type patch and the damaged asphalt shingles. These type of patches will require a heat source when installed to assure immediate adhesion and so as not to rely solely on the heat of the sun to effect a secure bonding. This will be accomplished by introducing the heat source from a typical, electric, hot air blowing roofing membrane, welder tool. These tools are readily available at any good roofing distributor or online. They feature temperature controls and are hand held. The installer will therefore install each patch of this type using this heat source to melt sufficiently the pre-installed adhesive to the point of liquefaction and then bond the patch over the damaged area completing the bond by applying sufficient pressure or an appropriate roller. If there is a notched patch, it will fit under the lifted edge of the existing shingle just above the repair area and the notch will be adhesive coated on top and bottom. When installed properly the notch and its adhesive will re-seal the edge of the lifted shingle back to the roof. For installations with no notch the patch will be butted up tightly to the bottom edge of the shingle above the repair area by the installer pushing the patch with an upward pressure against the two edges. This connection point can also be reinforced with a top quality adhesive caulking of either the clear variety or a similar color to the shingle being repaired. Again, if some rainwater does seep under the patch there is no threat for leaks to occur because the damaged area being patched is still sound and waterproof in and of itself.

2) Any one of the patches described above with either a notch or no notch with only one difference, namely, the adhesive described will not be pre-installed. The same type of adhesive as described above will not be pre-installed. The same type of adhesive as described above will be supplied using a "Hot Glue Gun" tool by the roofing technician in the field during the installation process. The hot adhesive can either be installed over the damaged shingle area directly, to the back of the shingle patch directly or any combination of the two. The type of adhesive used can be of any type that is suitable and compatible.

3) Any one of the patches described above with either a notch or no notch with only one difference, namely, that the adhesives used are not heat activated and are typical adhesives that are available for purchase everywhere in tubes that can be brought to the job site, and, by utilizing standard "Caulking Gun" tools to administer the correct quantities of sealant in the correct locations. These sealants may take longer to cure.

4) Any one of the patches described above with either a notch or no notch with only one difference, namely, the adhesives used are not heat activated or the typical, readily available types found everywhere. Instead, the adhesive used in this case would be a field applied, two part, asphalt/epoxy or the like that has an aggressive bonding characteristic as well as a "Fast Curing" characteristic. This initial bonding would take place quickly.

Figure 14:
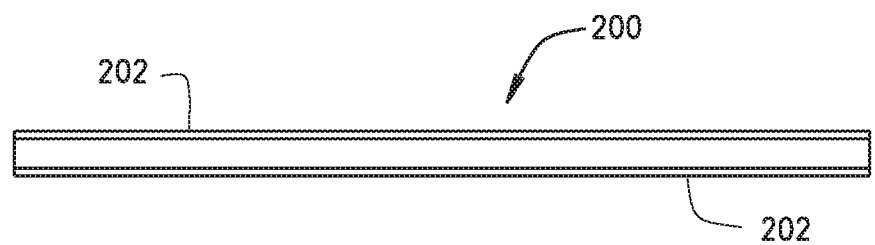
FIG. 14 is a side elevational view of a double sided adhesive tape used to form the shingle patch of FIG. 15.
Figure 15:
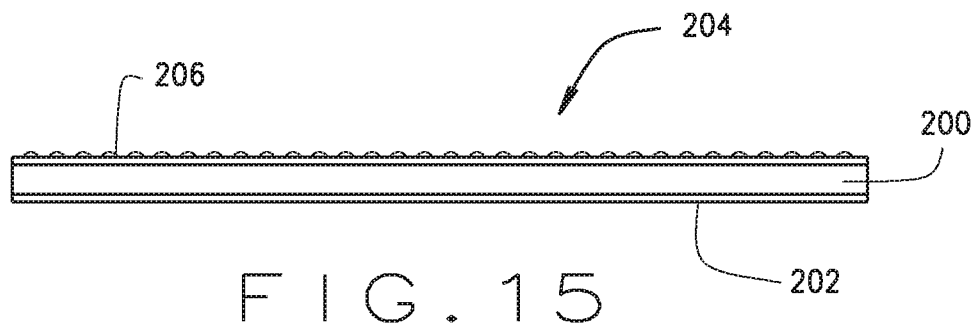
FIG. 15 is a side elevational view of another embodiment of a one-piece shingle patch formed solely from the double sided adhesive tape of FIG. 14.

Still further, it is also recognized and anticipated that a one-piece shingle patch can also be formed using solely a double sided adhesive tape 200 having a removable release film 202 associated with each opposite side thereof as illustrated in FIG. 14. In this particular embodiment, shingle patch 204 (FIG. 15) can be formed solely from a variety of two sided adhesive tapes using various types of membranes of varying thicknesses, shapes and sizes. These various two sided release membranes can be of the "reinforced" or non-reinforced varieties so long as they are capable of providing bonding features that are compatible with asphalt shingle and the purpose of the repair. This material can be cut to custom sizes needed in the field. Shingle patch 204 (FIG. 15) can be made from double sided adhesive tape 200 by removing the release film 202 associated with its bottom surface portion and thereafter placing the bottom surface of patch 204 over the damaged shingle area. Once the patch has been properly positioned, it will be applied with pressure or using a suitable roller that will complete the bond. The release tape 202 associated with the top surface of double sided tape 200 will then be removed and a user can sprinkle colored granules 206 over the adhesive associated with the top surface thereby matching the patch 204 to the existing shingles. These colored granules 206 will then be pressed into the tape or membrane using an appropriate roller to permanently embed the granules into the top surface thus providing UV protection for the tape or membrane, a suitable sufficiently waterproof bond to the damaged shingle, and a pleasing color to match the original roof. This forms a quick and inexpensive shingle patch which will blend in and match the existing shingles.

FIG. 16 illustrates a modified version 168 of the two-piece shingle patch 90 wherein again, the notched portion 94 has been eliminated from the lower base member 170. In all other respects, lower base member 170 is substantially identical to lower base member 92 and likewise includes a sealant and/or adhesive 172 and 174 covering at least a portion of its bottom and upper surfaces respectively, as well as a cellophane tape or other release material 176 and 178 which are likewise placed over the respective sealants 172 and 174 so as to prevent the sealant from binding to any other material or object during shipment and storage. The upper base member 112 is identical to base member 112 discussed above with respect to shingle patch 90. In this particular application, one end portion 180 of the lower base member 170 is again positioned in abutting relationship to the edge portion of the existing shingle located immediately above the damaged shingle and base member 170 is positioned directly over the damaged shingle, or over a shingle with exposed nails. The lower base member 170 is again sized and shaped to mate with and attach to the top surface of the damaged shingle as described above. The upper base member 112 is adhered to the lower base member 170 in a similar manner as described above with respect to shingle patch 90. Here again, shingle patch 168 does not require lifting of the existing shingle located immediate above the damaged shingle and thereby helps to preserve the attachment of the existing shingle to the roof structure.

Figure 17:
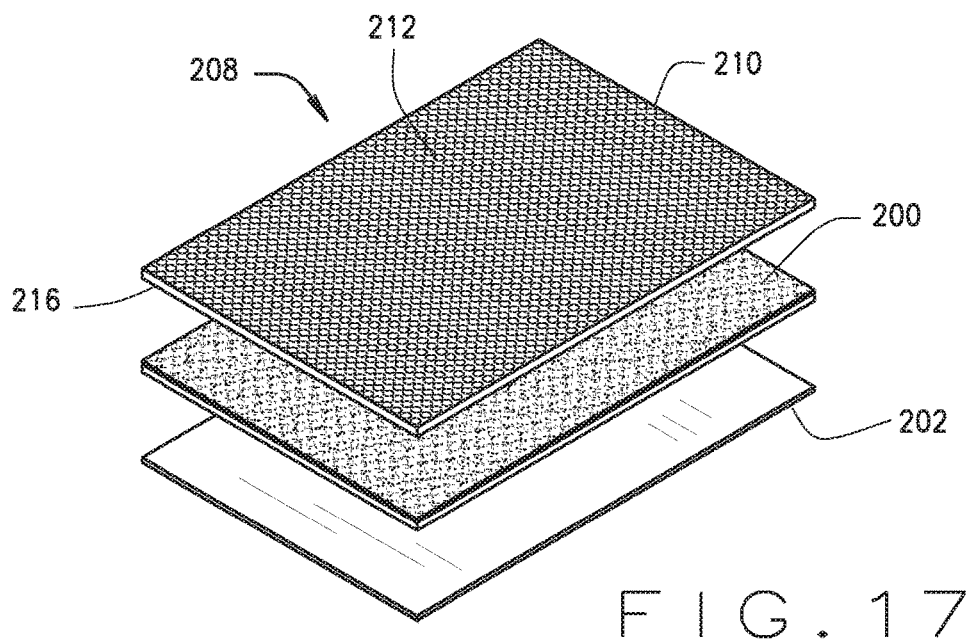
FIG. 17 is an exploded perspective view of still another embodiment of a one-piece shingle patch constructed according to the teachings of the present invention.

FIG. 17 illustrates a two-piece shingle patch 208 which can be made with an upper portion or base member 210 that is made out of, for example, conventional roof shingle material such as asphalt—fiberglass shingle material or SBS—modified asphalt shingle material or any other suitable/compatible materials which have a finish on the upper side consisting of typically used ceramic granules such as granules that are adhered to the upper surface of the base member to provide protection from U V rays and a palette of different color combinations to choose from. The lower portion or adhesive layer 200 is made of the highly aggressive adhesive layer that is a malleable, asphalt shingle compatible material such as but not limited to Butyl. This component is formed as a "Two Sided" adhesive release tape such as tape 200 in FIG. 14. This two sided tape 200 will be of different thicknesses, lengths, widths and shapes to accommodate different applications. This two sided release tape membrane can be reinforced with various scrim or fabrics made from various material that will be installed in the center of the adhesive material to provide extra body and dimensional stability. This lower portion 200 of the two-piece repair patch will be factory applied or applied in the field to the bottom surface of the upper base member 210 (typical asphalt shingle material) by removing one layer 202 of the protective release film on one side of the release tape 200 thus exposing the adhesive material, and, applying pressure as with a small rubber or metal roller until the two pieces, base member 210 and adhesive tape 200, are joined in a permanent bond. The top of the newly formed patch will have a typical asphalt shingle body with colored granules 212 above and the bottom of the patch 208 will have an aggressive adhesive covered with a removable, plastic or treated paper or other release film material 202 that will be released in the field to apply and stick the patch directly to or over the damaged shingle area. These two different top and bottom components are connected together to form the two piece patch 208 and it can be made both in a nailable and a non-nailable version, with or without a notch portion, as will be hereinafter explained.

The patches 208 can be available in different widths, lengths and colors to match the colors of the roof that have the damaged shingle. As a result, patch 208 includes a base member 210 made of the same material as the damaged shingle and an adhesive tape layer 200 which is likewise bonded to the bottom surface of the base member 210 as explained above. This adhesive layer 200 is a thin sheet formed from a two-sided adhesive tape made using, for example, butyl, modified bitumen, or any other workable substance that is compatible with asphalt shingles. The adhesive layer 200 may vary in thickness and will likewise be covered by a protective release tape 202 as explained above.

Figure 18:
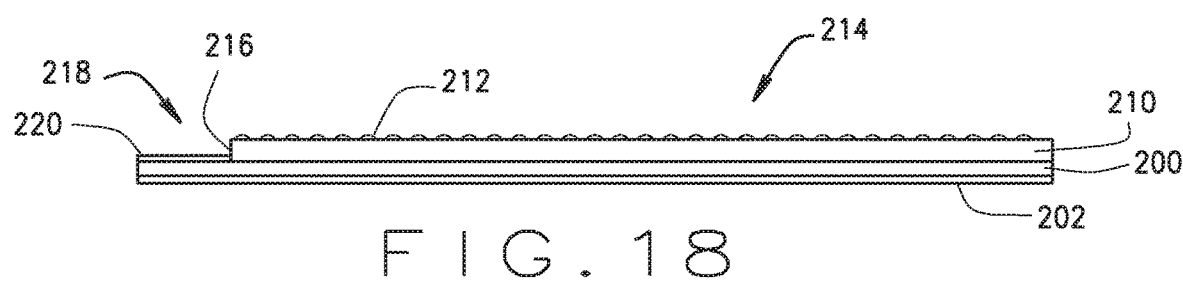
FIG. 18 is a side elevational view of still another embodiment of a one-piece shingle patch with a notched portion constructed according to the teachings of the present invention.

The shingle patch 208 illustrated in FIG. 17 does not include a notched portion as previously explained with respect to FIGS. 7 and 8 and FIGS. 10-12. A shingle patch similar to patch 208 having a notched portion can be easily made by extending both the double side adhesive tape layer 200 and its associated bottom release tape 202 past the top edge portion 216 (FIG. 18) of the base member 210 thereby forming a notched portion 218. The double sided adhesive tape 200 can be extended past the top edge portion 216 of base member 212 anywhere from at least one quarter to three quarters of one inch so as to create a sufficient notched portion 218 as illustrated in FIG. 18. Again, in the embodiment 214, the notch portion 218 is formed from the use of the double sided adhesive tape 200 and will likewise include another adhesive layer 220 covering the exposed notch portion 218 as best illustrated in FIG. 18. This shingle patch 214 can be used on new roofs where the shingle located above the damaged shingle can be easily lifted so that the notch portion 218 can be positioned under the shingle located immediately above. When installing the patch 214, a user will release the release tape 220 from the top of the notch portion 218 as well as removing the release tape 202 from the bottom portion of the patch 214 and will then slide the patch under the lifted lower edge of the shingle located immediately above the damaged shingle. The user will then press the patch 214 into place by hand over the damaged shingle and then complete the attachment process by using pressure or a suitable roller tool. It is also recognized and anticipated that the release tape 202 associated with the bottom portion of the patch 214 could likewise be folder over to cover the top portion of the notch portion 218 so that one single release tape is utilized.

Figure 19:
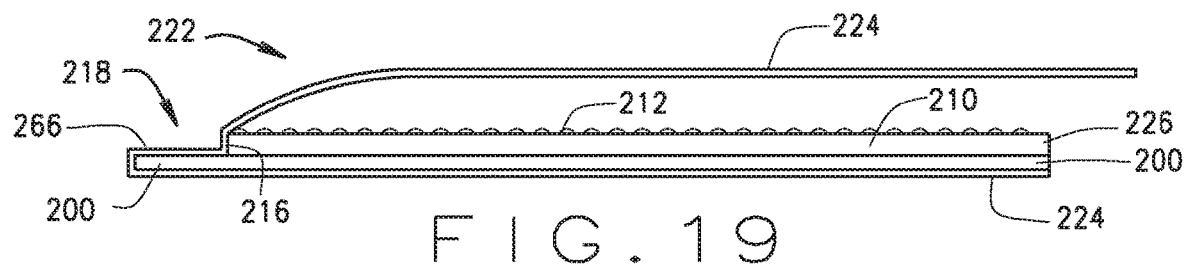
FIG. 19 is a side elevational view of another embodiment of the shingle patch of FIG. 18.
Figure 20:
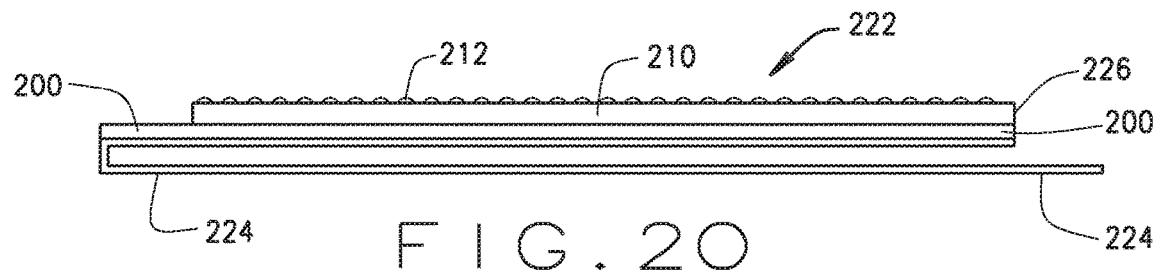
FIG. 20 is a side elevational view illustrating the partial removal of the release tape associated with the shingle patch of FIG. 19, the release tape being folded under the bottom portion of the shingle patch.

In an alternative embodiment, a shingle patch 222 as best illustrated in FIGS. 19 and 20 can likewise be utilized. Shingle patch 222 is substantially similar to shingle patch 214 and includes the same base member 210 and the same double sided adhesive layer 200 as discussed above with respect to shingle patch 208. Here again, the notch portion 218 is formed simply by extending the double sided adhesive tape 200 beyond the top edge portion 216 of base member 210. Shingle patch 222 differs from shingle patch 214 in the use of release tape 224 which is a removable extra-long release film member which extends completely across the bottom portion of the shingle patch 202 and extends up and over the top portion of notch portion 218 and up and over the top surface of shingle patch 222 as illustrated in FIG. 19. Ideally, release tape 224 will extend across the top portion of patch 222 and past the opposite top edge portion 226 of base member 210 as illustrated in FIG. 19. Obviously, the release tape 224 need not be attached to the top surface of base member 210.

When installing shingle patch 222, a user will release the film from the top of the notch portion 218 and will fold the release tape 224 back under the bottom surface of the patch so that the release tape will stick out from the underside portion of the patch past the top edge portion 226 of base member 210 as illustrated in FIG. 20. The user will then slide the notched portion 218 of the patch 222 under the lifted lower edge of the shingle located immediately above the damaged shingle and would then pull the rest of the release tape 224 out from under the patch 222 and press it into place by hand and then complete the attachment process using pressure or a suitable roller tool as explained above. By providing an extra-long release tape 224 so that it can be folded under the bottom portion of the patch 222 and past the top edge portion 226 provides a means for the user to easily grab hold of the release film after the notch portion has been inserted under the lower edge of the shingle located immediately above the damaged shingle. It is recognized and anticipated that the release tape 224 need not extend all the way to the opposite top edge portion 226 of patch 222 so long as the release tape 224 can be folded back under the patch so that at least a portion of the release tape is exposed for easy grasping by a user to complete the attachment process.

Figure 21:
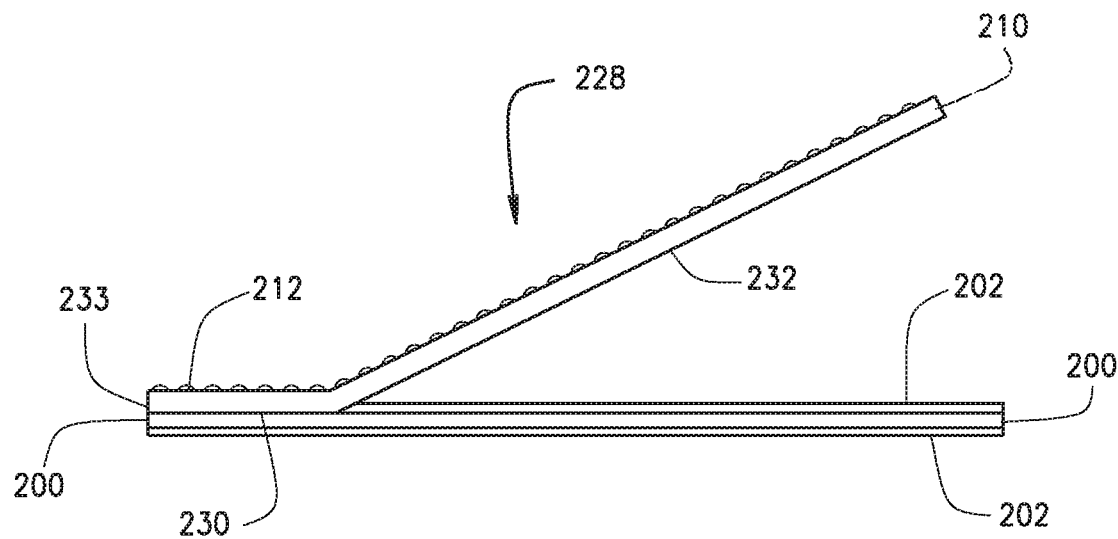
FIG. 21 is a side elevational view of another embodiment of a one-piece shingle patch constructed according to the teachings of the present invention with a flap.

A nailable version of the shingle patch 208 can be easily formed either at the factory or in the field by applying the double sided release tape 200 to only a portion of the bottom portion of the base member of the shingle patch as illustrated in FIG. 21. In the embodiment 228 illustrated in FIG. 21, the shingle base member 210 is the same upper shingle portion of shingle patch 208 illustrated in FIG. 17 and includes colored granules 212 attached or otherwise embedded into base member 210. A flap portion 232 is formed in shingle patch 228 by attaching only a portion of the double sided release tape 200 to a portion of the bottom portion of base member 210. In one embodiment, only approximately 20% of the top surface of the adhesive tape 200 is attached to the bottom portion of the base member 210 while the remaining 80% of the bottom portion of the base member 210 remains unattached to the adhesive tape 200 and approximately 80% of the top portion of the adhesive tape 200 includes the release tape or film 202. The patch 228 is formed by removing only a portion, or in one embodiment 20%, of the release tape 202 associated with the top portion of the double sided adhesive tape 200 and attaching that portion of the top surface of the adhesive tape 200 to the bottom surface of the base member 210. This attachment is along the attachment surface 230 as illustrated in FIG. 21. This forms the flap portion 232 as will be hereinafter explained.

When the shingle patch 228 is installed over the damaged shingle, the bottom release tape or film 202 associated with the bottom portion of the double sided adhesive tape 200 is removed thus exposing that adhesive surface completely and the patch 228 is then installed over the damaged shingle with pressure. Because at least a portion, or in the embodiment illustrated at least 80% or so, of the bottom portion of the asphalt shingle base member 210 is not adhered to the top portion of the adhesive tape 200, the installer is able to lift that portion of the asphalt shingle base member 210 namely, flap portion 232, as illustrated in FIG. 21 exposing the protective film 202. At this point, the protective film 202 associated with a portion of the top surface of the adhesive tape 200 is removed and a nail or plurality of nails can be installed directly through the adhesive tape 200 into the roof structure thus adding stability and strength to the overall patch. After any number of nails are installed through a portion of the adhesive tape 200, the flap portion 232 of base member 210 can be lowered and pressed into the remaining portion of the exposed adhesive tape 200 and pressure can be applied to complete the installation. This shingle patch 228 is substantially similar to shingle patch 42 (FIG. 6) except that it does not include a notch portion and the adhesive layer is formed solely through the use of a double sided adhesive tape 200 as previously explained. Since shingle patch 228 does not include a notched portion, one end portion of the patch such as end portion 233 can be positioned in abutting relationship to the existing shingle located immediately above the damaged shingle as previously explained with respect to shingle patch 156 illustrated in FIG. 13. In addition, in cases where the release tape 202 associated with the bottom portion of the adhesive tape 200 is difficult to remove, an extra-long release tape similar to release tape 224 illustrated in FIGS. 19 and 20 can be used in association with shingle patch 228 as previously explained.

Figure 22:
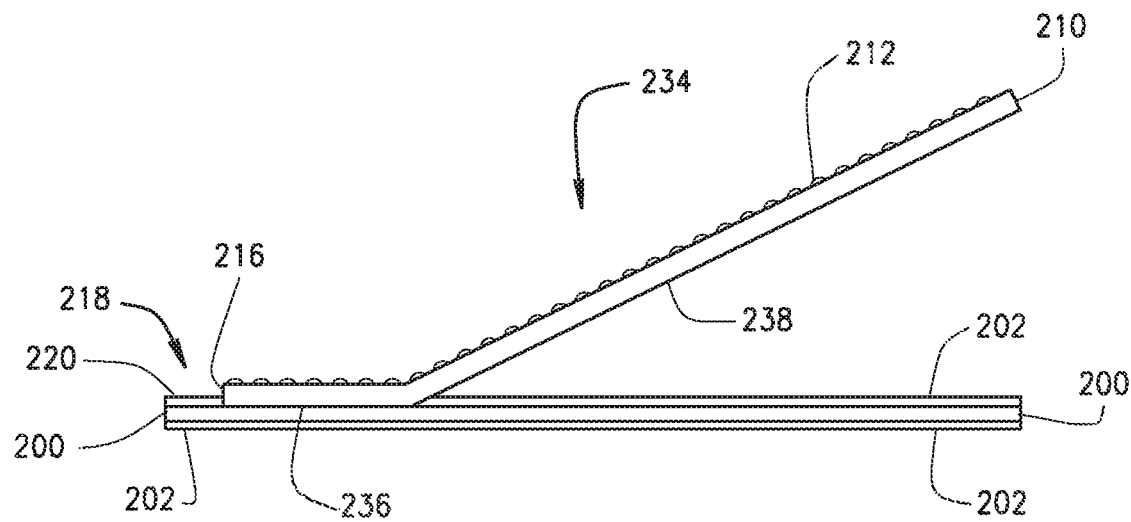
FIG. 22 is a side elevational view similar to FIG. 21 showing yet another embodiment of a one-piece shingle patch constructed according to the teachings of the present invention with a notched portion and a flap.

FIG. 22 illustrates another embodiment 234 of a nailable shingle patch similar to shingle patch 214 illustrated in FIG. 18 except that both a flap portion 238 is again formed in a similar manner as explained above with respect to shingle patch 228 and a notched portion 218 is also formed. In this particular embodiment, the top portion of the double sided adhesive tape 200 is attached only to a portion of the bottom surface of base member 210 along attachment surface 236 such that a portion of the adhesive tape extends past the top edge portion 216 of base member 210 as previously explained in order to form notch portion 218. Here again, since only a portion of the adhesive tape 200 is attached to a portion of the bottom portion of base member 210, a flap portion 238 is formed such that once the bottom portion of adhesive layer 200 is attached over the damaged portion of the damaged shingle, flap portion 238 of base member 210 can be lifted and any number of nails can be driven into the adhesive layer 200 once the remaining portion of the release tape 202 is removed from the top surface of adhesive layer 200. In all other respects, shingle patch 234 functions in a similar manner as shingle patch 214 and, if necessary, the release tape 202 associated with the bottom portion of the adhesive layer can again be an extra-long release tape similar to release tape 224 so that it can be folded up and over the top portion of the base member as previously explained with respect to FIGS. 19 and 20.

Figure 23:
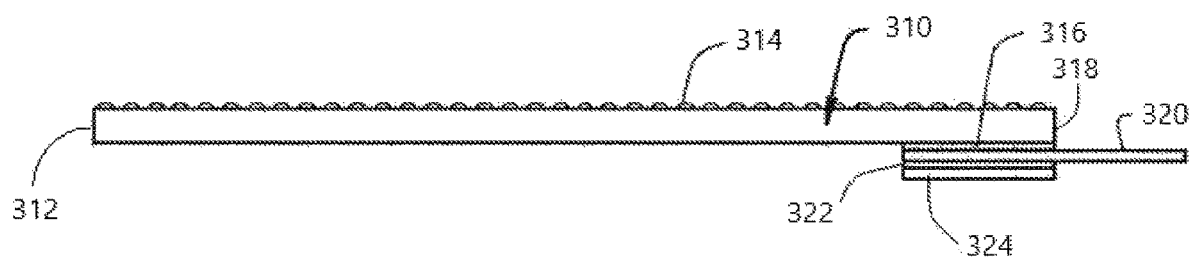
FIG. 23 is a side elevation view of an example embodiment of a shingle patch with a lip member and a strip of adhesive.

FIG. 23 illustrates another embodiment of a shingle patch 310 according to an example embodiment. Shingle patch 310 may include a base member 312 and granules 314 as discussed in detail above. An adhesive strip 316 is positioned proximate an upper edge 318 of the base member 312. The adhesive strip 316 preferably permanently bonds a rigid lip 320 to the base member 312. The rigid lip 320 may be made of metal, such as a metal that is resistant to rusting, or any other suitably durable and rigid material. As shown, the rigid lip 320 preferably extends beyond the upper edge 318 of the base member 312. An adhesive strip 322 is positioned on at least a portion of the bottom side of the rigid lip 320, or proximate the rigid lip 320, or elsewhere on the underside of the base member 312, and release tape 324 is temporarily affixed to the adhesive strip 322. The adhesive strip 322 is composed of an adhesive that adheres securely without an extended or heat-induced cure period. Standard adhesive may be applied to the remainder of the bottom of the base member 312, or further adhesive like that found in adhesive strip 322 may be applied to the remainder of the bottom of the base member 312.

Figure 24:
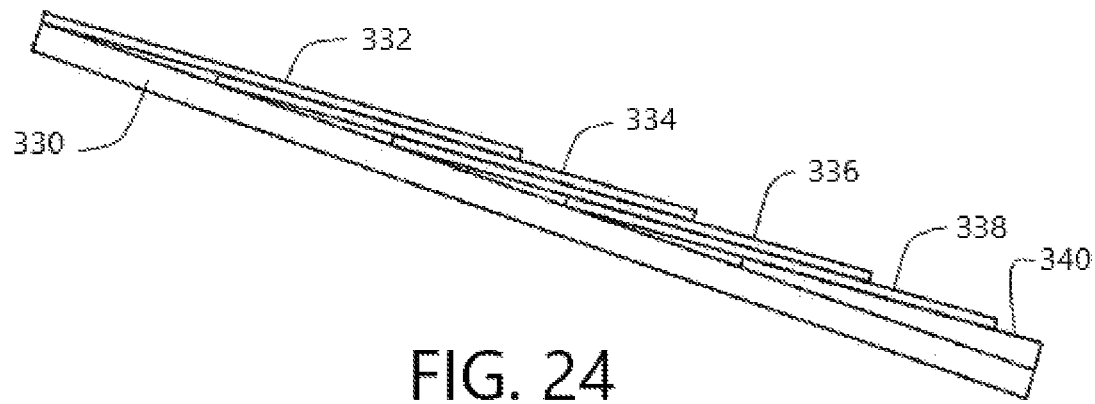
FIG. 24 is a side elevational view of a typical shingled roof showing the overlaying pattern arrangement of shingles before the present shingle patch is applied for repair.
Figure 25:
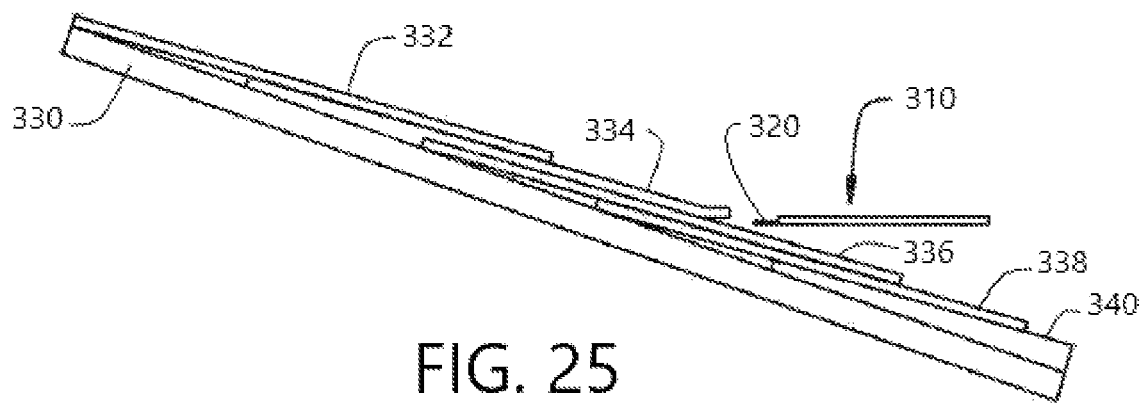
FIG. 25 is a side elevational view similar to FIG. 24 showing the present shingle patch of FIG. 23 in exploded view prior to insertion for repair.
Figure 26:
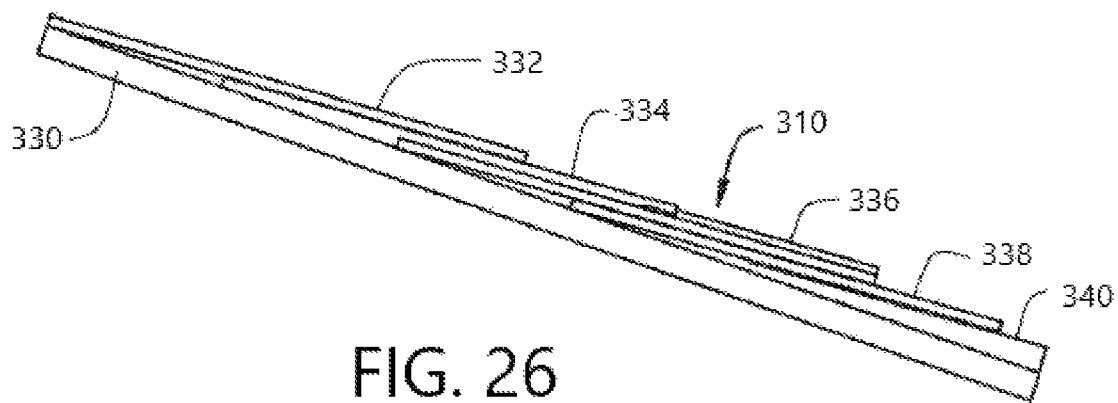
FIG. 26 is a side elevational view similar to FIG. 25 showing the present shingle patch of FIG. 23 positioned and attached to the existing roof structure and overlaying the damaged shingle.

FIG. 24 illustrates a typical asphalt shingled roof wherein the underlying roof structure 330 is typically plywood or some other wood product. Typical asphalt shingles 332, 334, 336, 338 and 340 are overlaid in a typical overlapping pattern as illustrated in FIG. 24. Assuming that asphalt shingle 336 is damaged by hail or any other weather event, FIGS. 25 and 26 illustrate the method for repairing damaged asphalt shingle 336 using the present shingle patch 310. Repair will typically begin as illustrated in FIG. 25 where a technician will lift the bottom edge of the shingle 334 that lies immediately above the damaged shingle 336. As illustrated in FIG. 25, the bottom edge of shingle 334 lies just one row above the damaged shingle 336. Lifting of the bottom edge of shingle 334 can be accomplished with known tools in the trade. Once the bottom edge of shingle 334 is lifted as illustrated, the technician will remove the release tape 324 positioned on the underside of the base member 312 or rigid lip 320, and then slide the rigid lip 320 under the raised portion of shingle 334. The raised shingle portion of shingle 334 is then lowered onto the rigid lip 320.

It will be understood that in some situations, the shingles 334, 336 may be old and brittle, such that the lower edge of shingle 334 may not be suitable for lifting. In such a situation, the rigid lip 320 is preferably thin enough to be forced under the lower portion of shingle 334 during installation. In some embodiments, the rigid lip may actually be somewhat sharp at its distal edge for this reason.

Once the rigid lip 320 is inserted under the existing adjacent shingle 334, the remainder of the shingle patch 310 is then adhered to the shingle 336, either with standard heat-curable adhesive or with more adhesive similar to that found in adhesive strip 322, as best illustrated in FIG. 26. Once adhered, the undersurface of base member 312 is sealed directly to the damaged shingle 336. Once completed, the shingle patch 310 will overlay the damaged shingle 336 as illustrated in FIG. 26 and the colored granules associated with the top surface of base member 312 will match the color scheme of the other shingles 332, 334, 336, 338 and 340 associated with the roof structure. The rigid lip 320 provides additional leak protection, acting akin to flashing. The adhesive strip 322 combined with the rigid lip 320 eliminates water lap, as rain may not flow under the patch before any field-applied adhesive dries. It will be understood that the rigid lip 320 or the adhesive strip 322 may be used on a shingle patch 310 without the other. It will also be understood that an adhesive strip 322 may be positioned on an upper surface of the rigid lip 320 to help the shingle above adhere to the rigid lip 320.

As the damaged shingle 336 remains in place, the present shingle patch 310 provides an extra layer of protection since the damaged shingle 336 still provides some protection to the roof structure. Depending upon the size of the damaged area associated with shingle 336, shingle patch 310 can be sized and dimensioned so as to adequately overlay the damaged area of shingle 336. In this regard, shingle patch 310 can merely cover a portion of shingle 336 or, in other embodiments, it can cover substantially all of shingle 336 if so desired. Shingle patch 310 can be made according to any dimensions up to and including covering the entire damaged asphalt shingle.

All of the shingle patches disclosed herein including shingle patches 168, 208, 222, and 310 can be made by modifying existing stock shingles of different styles, colors and manufacturers by cutting them to size so as to fit the particular application. The shingle patches can be made in various sizes and repackaged and sold through the distributor chains that sell the matching shingles, thus making these shingle patches readily available for use. All of the above-disclosed shingle patches may be installed without the use of nails as the adhesives alone provide the permanent and waterproof bonding together of all surfaces. It is also recognized and anticipated that the adhesives used in the above-referenced shingle patch embodiments can take on a wide variety of different forms as explained above.

It is also recognized that when the weather is extremely hot, all of the shingle patches that utilize the double sided adhesive tape 200 may become sticky or tacky. This is because the adhesive is heat sensitive and is designed to form a seal with the roof structure when exposed to the sun or heat. This can be avoided by cooling or freezing the shingle patch in a cooler with dry ice or any other cooling medium. This can be achieved on the job site and makes installation much easier on extremely hot days.

Understanding the scope of the present invention, the term "comprising" and its derivatives, as used herein, are intended to be open-ended terms that specify the presence of the stated features, elements, components and/or groups, but do not exclude the presence of other unstated features, elements, components and/or groups. The foregoing also applies to words having similar meanings such as the terms "including", "having" and their derivatives. The terms of degree such as "substantially", "about" and "approximate" as used herein mean a reasonable amount of deviation of the modified term such that the end result is not significantly changed.

Only selected embodiments have been chosen to illustrate the present inventions. The various constructions described above and illustrated in the drawings are presented by way of example only and are not intended to limit the concepts and principals of the present inventions. It is also recognized and anticipated that the size, shape, location and other orientation of the various components and/or elements associated with the present inventions can be changed as needed and/or as desired depending upon a particular application. Components that are shown directly connected or contacting each other can have intermediate structures disposed between them. In addition, the functions of one element can be performed by two elements, and vice versa. The structures and functions of one embodiment can also be adopted in another embodiment. It is not necessary for all advantages to be present in a particular embodiment at the same time. Thus, the foregoing descriptions of the embodiments according to the present inventions are provided for illustration only, and not for the purpose of limiting the inventions as defined by the appended claims and their equivalents.

Thus, there has been shown and described several embodiments of a novel shingle patch for damage repair of asphalt shingles. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

The invention claimed is:

1. A shingle patch used for repairing a damaged portion of a damaged shingle, the shingle patch comprising:
   a base member having top and bottom surfaces and opposed end portions, the base member being sized and shaped to overlay the damaged portion of the damaged shingle;
   a rigid lip adhered to the bottom surface of the base member proximate a first of the opposed end portions, and extending forward of the first opposed end portion of the base member;
   an adhesive positioned on a bottom side of the rigid lip attaching the base member to the damaged portion of the damaged shingle; and
   color granules attached to at least a portion of the top surface of said base member;
   wherein the base member is made of a first material and the rigid lip is made of a second material and the second material is more rigid than the first material.

2. The shingle patch defined in claim 1 wherein the rigid lip is made of metal.

3. The shingle patch defined in claim 1 wherein the rigid lip is composed of a non-rusting material.

4. The shingle patch defined in claim 1, further including release tape releasably applied to the adhesive below the rigid lip.

5. The shingle patch defined in claim 1 wherein the adhesive creates a water-tight and non-slip bond with the damaged shingle upon installation.

6. The shingle patch defined in claim 1 wherein the rigid lip is positioned under a shingle above the damaged shingle to serve as flashing.

7. A shingle patch used for repairing a damaged portion of a damaged shingle, the shingle patch comprising:
   a base member having top and bottom surfaces and opposed end portions, the base member being sized and shaped to overlay the damaged portion of the damaged shingle;
   a rigid lip adhered to the bottom surface of the base member proximate a first of the opposed end portions, and extending forward of the first opposed end portion of the base member;
   adhesive positioned on the bottom surface of the base member, attaching the base member to the damaged portion of the damaged shingle; and
   color granules attached to at least a portion of the top surface of said base member;
   wherein the base member is made of a first material and the rigid lip is made of a second material and the second material is more rigid than the first material.

8. The shingle patch defined in claim 7 wherein the rigid lip is made of metal.

9. The shingle patch defined in claim 7 wherein the rigid lip is composed of a non-rusting material.

10. A shingle patch used for repairing a damaged portion of a damaged shingle, the shingle patch comprising:
    a base member having top and bottom surfaces and opposed end portions, the base member being sized and shaped to overlay the damaged portion of the damaged shingle;
    a rigid lip adhered to the bottom surface of the base member proximate a first of the opposed end portions, and extending forward of the first opposed end portion of the base member;
    an adhesive positioned on a bottom side of the rigid lip attaching the base member to the damaged portion of the damaged shingle; and
    color granules attached to at least a portion of the top surface of said base member;
    wherein the adhesive is positioned only on a portion of the bottom side of the rigid lip that is directly below the base member, and wherein there is no adhesive on a portion of the bottom side of the rigid lip that extends beyond the base member.

11. The shingle patch defined in claim 10 wherein the rigid lip is made of metal.

12. The shingle patch defined in claim 10 wherein the rigid lip is composed of a non-rusting material.

13. The shingle patch defined in claim 10 wherein the rigid lip is positioned under a shingle above the damaged shingle to serve as flashing.

* * * * *